(12) United States Patent
Labbe et al.

(10) Patent No.: US 11,472,347 B2
(45) Date of Patent: Oct. 18, 2022

(54) STACKABLE CONTAINER ASSEMBLY

(71) Applicant: BOMBARDIER RECREATIONAL PRODUCTS INC., Valcourt (CA)

(72) Inventors: Christian Labbe, Sherbrooke (CA); Mathieu Mercier, Sherbrooke (CA); Eric Fournier, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/924,400

(22) Filed: Jul. 9, 2020

(65) Prior Publication Data
US 2020/0339040 A1 Oct. 29, 2020

Related U.S. Application Data

(63) Continuation of application No. 16/518,470, filed on Jul. 22, 2019, now Pat. No. 10,744,953, which is a
(Continued)

(51) Int. Cl.
*B60R 9/06* (2006.01)
*B60K 15/03* (2006.01)
(Continued)

(52) U.S. Cl.
CPC ........ *B60R 9/065* (2013.01); *B60K 15/03177* (2013.01); *B60K 15/0406* (2013.01); *B60K 15/0409* (2013.01); *B60K 15/06* (2013.01); *B60K 15/067* (2013.01); *B62J 9/23* (2020.02); *B62J 9/27* (2020.02); *B62J 35/00* (2013.01); *B62M 27/02* (2013.01); *B65D 21/0212* (2013.01); *B65D 25/20* (2013.01);
(Continued)

(58) Field of Classification Search
CPC .... B62M 2027/028; B60R 9/06; B60R 9/065; B60R 9/08; B65D 21/0212; B25H 3/021
USPC ............ 224/408; 220/23.6, 23.83, 4.26, 4.27
See application file for complete search history.

(56) References Cited

U.S. PATENT DOCUMENTS 4,266,703 A * 5/1981 Litz ............................ B62J 7/04
224/443
5,251,771 A * 10/1993 Hotsumi ................. B60R 11/02
220/241
(Continued)

FOREIGN PATENT DOCUMENTS

WO 2013149028 A1 10/2013

*Primary Examiner* — Justin M Larson
(74) *Attorney, Agent, or Firm* — BCF LLP

(57) ABSTRACT

A container, a stackable container assembly and a vehicle having a container. The container includes a container body having a top surface and a bottom surface; and a fixture assembly configured for receiving an accessory container, the fixture assembly being separately formed from and attached to the top surface, the bottom surface being configured for connecting the container to a vehicle, the bottom surface including: a tongue attached to the bottom surface, the tongue extending from the bottom surface, the tongue being configured for inserting into a first vehicle anchor fixture connected to the vehicle, and an anchor attached to the bottom surface, the anchor being configured for inserting into a second vehicle anchor fixture, the anchor including: at least one anchor lock extending parallel to the bottom surface.

11 Claims, 20 Drawing Sheets

Related U.S. Application Data continuation of application No. 15/387,847, filed on Dec. 22, 2016, now Pat. No. 10,391,949.

(60) Provisional application No. 62/270,983, filed on Dec. 22, 2015.

(51) Int. Cl.

| | | |
|---|---|---|
| *B60K 15/04* | (2006.01) | |
| *B62J 9/23* | (2020.01) | |
| *B62J 9/27* | (2020.01) | |
| *B60K 15/06* | (2006.01) | |
| *B60K 15/067* | (2006.01) | |
| *B62J 35/00* | (2006.01) | |
| *B62M 27/02* | (2006.01) | |
| *B65D 21/02* | (2006.01) | |
| *B65D 25/20* | (2006.01) | |
| *B65D 25/28* | (2006.01) | |
| *B65D 43/16* | (2006.01) | |
| *B65D 47/12* | (2006.01) | |
| *B60K 15/063* | (2006.01) | |

(52) U.S. Cl.
CPC ......... *B65D 25/2882* (2013.01); *B65D 43/16* (2013.01); *B65D 47/12* (2013.01); *B60K 2015/0638* (2013.01); *B60Y 2200/252* (2013.01); *B62M 2027/028* (2013.01)

(56) References Cited

U.S. PATENT DOCUMENTS

| | | | | |
|---|---|---|---|---|
| 5,435,471 A * | 7/1995 | Chuang | .................. | B62J 9/00 |
| | | | | 224/419 |
| 6,802,440 B1 * | 10/2004 | Stowell | ................... | B62J 9/26 |
| | | | | 224/413 |
| 6,983,946 B2 | 1/2006 | Sullivan | ................ | B62B 1/002 |
| | | | | 206/511 |
| 7,234,905 B2 * | 6/2007 | Warnock | ............ | B60D 1/015 |
| | | | | 280/423.1 |
| 8,292,139 B2 * | 10/2012 | Golub | ..................... | B62J 7/08 |
| | | | | 224/419 |
| 8,439,387 B1 * | 5/2013 | Connell | ................ | B62D 53/08 |
| | | | | 280/438.1 |
| 8,777,531 B2 * | 7/2014 | Massicotte | ................ | B60P 7/08 |
| | | | | 410/82 |
| 8,864,002 B2 * | 10/2014 | Iida | ........................... | B62J 7/04 |
| | | | | 224/413 |
| 8,875,888 B2 * | 11/2014 | Koenig | ................... | B25H 3/02 |
| | | | | 206/508 |
| 9,056,641 B2 * | 6/2015 | Visenzi | ...................... | B62J 9/20 |
| 9,393,685 B2 * | 7/2016 | Chen | ....................... | B25H 3/02 |
| 9,505,335 B2 * | 11/2016 | Massicotte | ........... | B60P 7/0807 |
| 9,751,592 B2 | 9/2017 | Labbe et al. | | |
| 9,926,104 B2 * | 3/2018 | Olarte | ................... | B65D 21/023 |
| RE47,022 E | 9/2018 | Sosnovsky et al. | | |
| 10,315,800 B2 | 6/2019 | Olarte | | |
| 10,391,949 B2 | 8/2019 | Labbe et al. | | |
| 10,583,883 B2 * | 3/2020 | Visenzi | ...................... | B62J 7/08 |
| 10,703,534 B2 * | 7/2020 | Brunner | ................. | B25H 3/021 |
| 10,710,770 B2 * | 7/2020 | Kogel | ................. | B65D 21/0212 |
| 10,744,953 B2 * | 8/2020 | Labbe | ..................... | B60R 9/065 |
| 10,787,049 B2 * | 9/2020 | Standifer | ............... | B60D 1/015 |
| 10,787,216 B2 * | 9/2020 | Visenzi | ...................... | B62J 9/26 |
| 10,793,172 B2 * | 10/2020 | Brunner | ................. | B25H 3/02 |
| 10,850,806 B2 * | 12/2020 | Labbe | ....................... | B60R 9/06 |
| 2003/0150894 A1 * | 8/2003 | Fang | ........................ | B62J 9/20 |
| | | | | 224/413 |
| 2006/0138185 A1 * | 6/2006 | Lien | ........................ | B62J 7/00 |
| | | | | 224/427 |
| 2008/0073396 A1 * | 3/2008 | Chiang | ...................... | B62J 9/20 |
| | | | | 224/413 |
| 2010/0025137 A1 | 2/2010 | Mughal | | |
| 2010/0147916 A1 | 6/2010 | Roberts et al. | | |
| 2015/0210355 A1 | 7/2015 | Labbe et al. | | |
| 2015/0376917 A1 * | 12/2015 | Brunner | ............. | A47B 87/0276 |
| | | | | 312/108 |
| 2016/0130034 A1 * | 5/2016 | Kuhls | .................... | B25H 3/023 |
| | | | | 206/510 |
| 2016/0229356 A1 | 8/2016 | Nolan | | |
| 2017/0174145 A1 | 6/2017 | Labbe et al. | | |
| 2017/0318927 A1 * | 11/2017 | Kraus | .................... | A45C 13/02 |
| 2017/0327185 A1 | 11/2017 | Labbe et al. | | |
| 2019/0039781 A1 | 2/2019 | Kogel et al. | | |
| 2019/0248543 A1 * | 8/2019 | Olarte | ................ | B65D 21/0212 |
| 2019/0344723 A1 | 11/2019 | Labbe et al. | | |
| 2020/0078929 A1 * | 3/2020 | Liu | ..................... | B65D 21/0222 |
| 2020/0331405 A1 * | 10/2020 | Robillard | ................ | B60R 9/065 |
| 2020/0339040 A1 * | 10/2020 | Labbe | .................... | B62M 27/02 |
| 2020/0346819 A1 * | 11/2020 | Kogel | ................. | B65D 21/0223 |
| 2021/0031975 A1 * | 2/2021 | Brunner | ............. | B65D 21/0224 |

\* cited by examiner

STACKABLE CONTAINER ASSEMBLY

CROSS-REFERENCE

The present application is a continuation of U.S. patent application Ser. No. 16/518,470, filed Jul. 22, 2019, which is a continuation of U.S. patent application Ser. No. 15/387,847 which issued as U.S. Pat. No. 10,391,949 on Aug. 27, 2019, which in turn claims priority to U.S. Provisional Patent Application No. 62/270,983 filed on Dec. 22, 2015, the entirety of all which is incorporated herein by reference.

TECHNICAL FIELD

The present technology relates to a container and a stackable container assembly for a vehicle.

BACKGROUND

Vehicles such as snowmobiles often carry additional fuel in containers called jerry cans, as well as miscellaneous accessories such as personal items, equipment, and the like, in addition to passengers. The vehicles may be provided with sections or racks and the like to carry cargo. The cargo items are often secured to parts of the vehicles by ropes, cords, tie-downs and the like.

This is not, however, a convenient method for transporting objects on a vehicle. Jerks and bumps experienced during travel can sometimes result in objects shifting within the spaces in which they were placed, or loosening from the grips of the tying cords. It is not always easy to find a space having the ideal shape or size for carrying particular objects, or to find a hook or structure for securing an object to in the desired location. Additionally, there is limited space on the sections or racks provided to carry the cargo. In some cases, riders may need to decide between bringing a jerry can with additional fuel or an accessory container for miscellaneous other objects.

Therefore, there is a need for a versatile system for containers such that a jerry can and an accessory container can be transported simultaneously in or on vehicles and securely connect to the provided cargo sections.

SUMMARY

It is an object of the present to ameliorate at least some of the inconveniences present in the prior art.

According to an aspect of the present technology, there is provided a container including a container body having a top surface and a bottom surface; and a fixture assembly configured for receiving an accessory container, the fixture assembly being separately formed from and attached to the top surface, the bottom surface of the container body being configured for connecting the container to a vehicle, the bottom surface including: a tongue attached to the bottom surface at a first end portion of the bottom surface, the tongue extending from the bottom surface, the tongue being configured for inserting into a first vehicle anchor fixture connected to the vehicle, and an anchor attached to the bottom surface at a second end portion of the bottom surface opposite the first end portion, the anchor being configured for inserting into a second vehicle anchor fixture, the anchor including: at least one anchor lock extending parallel to the bottom surface of the container body.

In some implementations, the anchor further includes a stem extending downward from the bottom surface, the at least one anchor lock being connected to and extending from the stem.

In some implementations, when the anchor is inserted in the second vehicle anchor fixture, the stem passes through an aperture of the second vehicle anchor fixture.

In some implementations, the fixture assembly includes a fixture plate; and at least one anchor fixture connected to the fixture plate.

In some implementations, the fixture plate includes a handle configured for carrying the container.

In some implementations, the fixture assembly is removable from the container.

In some implementations, the container further includes a fluid filling neck configured for filling an interior of the container with fluid; and the fluid filling neck: extends from the container body; and is outside an exterior edge of the fixture plate.

According to another aspect of the present technology, there is provided a stackable container including a base container including a container body having a top surface and a bottom surface, the bottom surface being configured for connecting the base container to a vehicle; a tongue connected to the container body and being configured for inserting into a first vehicle anchor fixture connected to the vehicle; and an anchor connected to the container body and being configured for inserting into a second vehicle anchor fixture, the anchor including: an anchor base being connected to the bottom surface of the container body; and at least one anchor lock extending from the anchor base, the at least one anchor lock extending parallel to the bottom surface of the container body; and an accessory container including: an accessory body having an accessory bottom surface for selectively connecting the accessory container to the top surface of the base container such that the accessory container is stacked on top of the base container.

In some implementations, the tongue and the anchor are disposed on opposite sides of the container body.

In some implementations, the stackable container assembly further includes a fixture assembly attached to the top surface of the container body, the fixture assembly being configured for receiving the accessory container; and the fixture assembly includes a fixture plate; and at least one anchor fixture connected to the fixture plate.

In some implementations, the fixture assembly is removable from the base container.

In some implementations, the fixture plate includes a handle; and the bottom surface of the accessory body is configured for receiving the handle attached to the fixture plate when the accessory container is connected to the base container.

In some implementations, the anchor further includes a stem extending downward from the bottom surface, the at least one anchor lock being connected to and extending from the stem.

In some implementations, when the anchor is inserted in the second vehicle anchor fixture, the stem passes through an aperture of the second vehicle anchor fixture.

According to another aspect of the present technology, there is provided a vehicle including a first vehicle anchor fixture and a second vehicle anchor fixture; a base container connected to the first and second vehicle anchor fixtures, the base container including: a container body having a top surface and a bottom surface, the bottom surface being selectively connected to the first and second vehicle anchor fixtures; a tongue connected to the container body and being selectively inserted into the first vehicle anchor fixture; and an anchor connected to the container body and being selectively inserted into the second vehicle anchor fixture, the anchor including: an anchor base being connected to the bottom surface of the container body; and at least one anchor lock extending from the anchor base, the anchor lock extending parallel to the bottom surface of the container body; and an accessory container including: an accessory body having an accessory bottom surface for selectively connecting the accessory container to the top surface of the base container such that the accessory container is stacked on top of the base container.

In some implementations, the vehicle is a snowmobile including: a frame including a tunnel, the first and second vehicle anchor fixtures being connected to a top side of the tunnel; a motor connected to the frame; a drive track disposed at least in part under the tunnel, the drive track being operatively connected to and driven by the motor; at least one ski operatively connected to the frame; and a straddle seat disposed above the tunnel; and wherein: the accessory container extends at least partially above the straddle seat when the accessory container is connected to the base container; and a top surface of the straddle seat extends above the top surface of the container body of the base container.

In some implementations, the anchor further includes a stem extending downward from the bottom surface, the at least one anchor lock being connected to and extending from the stem.

In some implementations, the stem passes through an aperture of the second vehicle anchor fixture.

In some implementations, the vehicle further includes a fixture assembly attached to the top surface of the container body, the fixture assembly being configured for receiving the accessory container; and the fixture assembly includes: a fixture plate; and at least one anchor fixture connected to the fixture plate.

In some implementations, the fixture plate includes a handle; and the bottom surface of the accessory body is configured for receiving the handle attached to the fixture plate when the accessory container is connected to the base container.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle, in a straight ahead orientation (i.e. not steered left or right), and in an upright position. When referring to a component alone, terms related to spatial orientation should be taken with respect to the component itself. The explanations provided above regarding the above terms take precedence over explanations of these terms that may be found in any one of the documents incorporated herein by reference.

Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 19A being a left, rear side perspective view; FIG. 19B being a rear, right side perspective view; FIG. 19C being a top plan view; and FIG. 19D being a left elevation view of the left anchor fixture;

DETAILED DESCRIPTION

A container and a stackable container assembly will be described with respect to a snowmobile 10. However, it is contemplated that the container and stackable container assembly could be used on different types of vehicles, such as side-by-side vehicles (SSVs) or all-terrain vehicles (ATVs).

Figure 1:
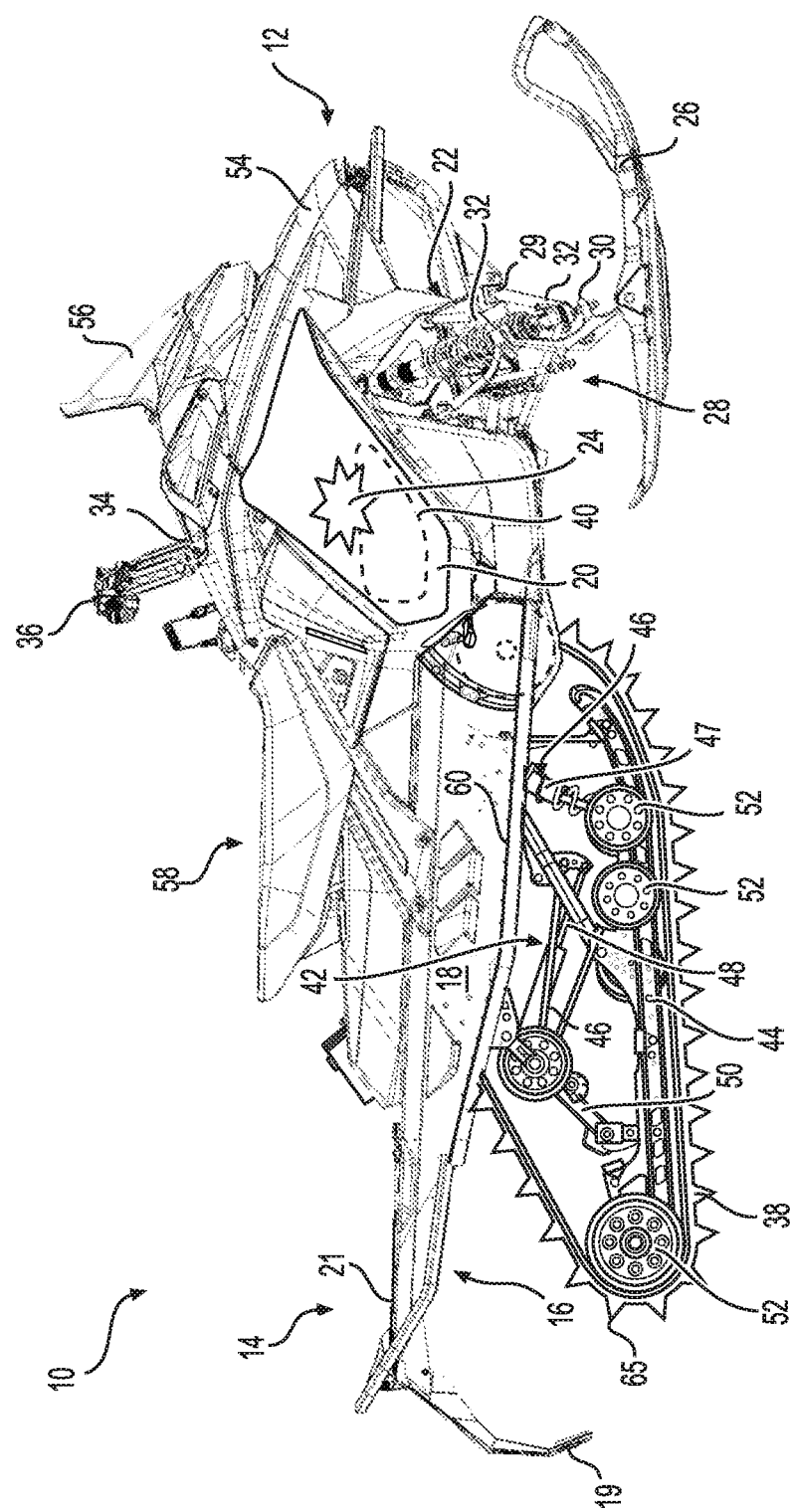
FIG. 1 is a right side elevation view of a snowmobile.

Turning now to FIG. 1, the snowmobile 10 includes a forward end 12 and a rearward end 14 that are defined consistently with a forward travel direction of the snowmobile 10. The snowmobile 10 includes a frame 16 that includes a tunnel 18, a motor cradle portion 20 and a front suspension assembly portion 22. A motor, which in the present implementation is an internal combustion engine 24 (schematically illustrated in FIG. 1), is carried by the motor cradle portion 20 of the frame 16. Two skis 26 are positioned at the forward end 12 of the snowmobile 10 and are attached to the front suspension assembly portion 22 of the frame 16 through front suspension assemblies 28. Each front suspension assembly 28 includes a shock absorber assembly 29, a ski leg 30 and supporting arms 32. Ball joints and steering rods (not shown) operatively connecting the skis 26 to a steering column 34. A steering device in the form of handlebar 36 is attached to the upper end of the steering column 34 to allow a driver to rotate the ski legs 30 and thus the skis 26, in order to steer the snowmobile 10.

An endless drive track 38 is disposed generally under the tunnel 18 and is operatively connected to the engine 24 through a CVT 40 (schematically illustrated by broken lines in FIG. 1). The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs 47 surrounding the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the engine 24 and the CVT 40, thereby providing an external shell that protects the engine 24 and the CVT 40. The fairings 54 include a hood and one or more side panels that can be opened to allow access to the engine 24 and the CVT 40 when this is required, for example, for inspection or maintenance of the engine 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward.

A straddle seat 58 is positioned over the tunnel 18. Two footrests 60 are positioned on opposite sides of the snowmobile 10 below the seat 58 to accommodate the driver's feet. A snow flap 19 is disposed at the rear end 14 of the snowmobile 10. The tunnel 18 consists of one or more pieces of sheet metal arranged to form an inverted U-shape that is connected at the front to the motor cradle portion 20 and extends rearward therefrom.

The snowmobile 10 has other features and components which would be readily recognized by one of ordinary skill in the art, further explanation and description of these components will not be provided herein.

Figure 2:
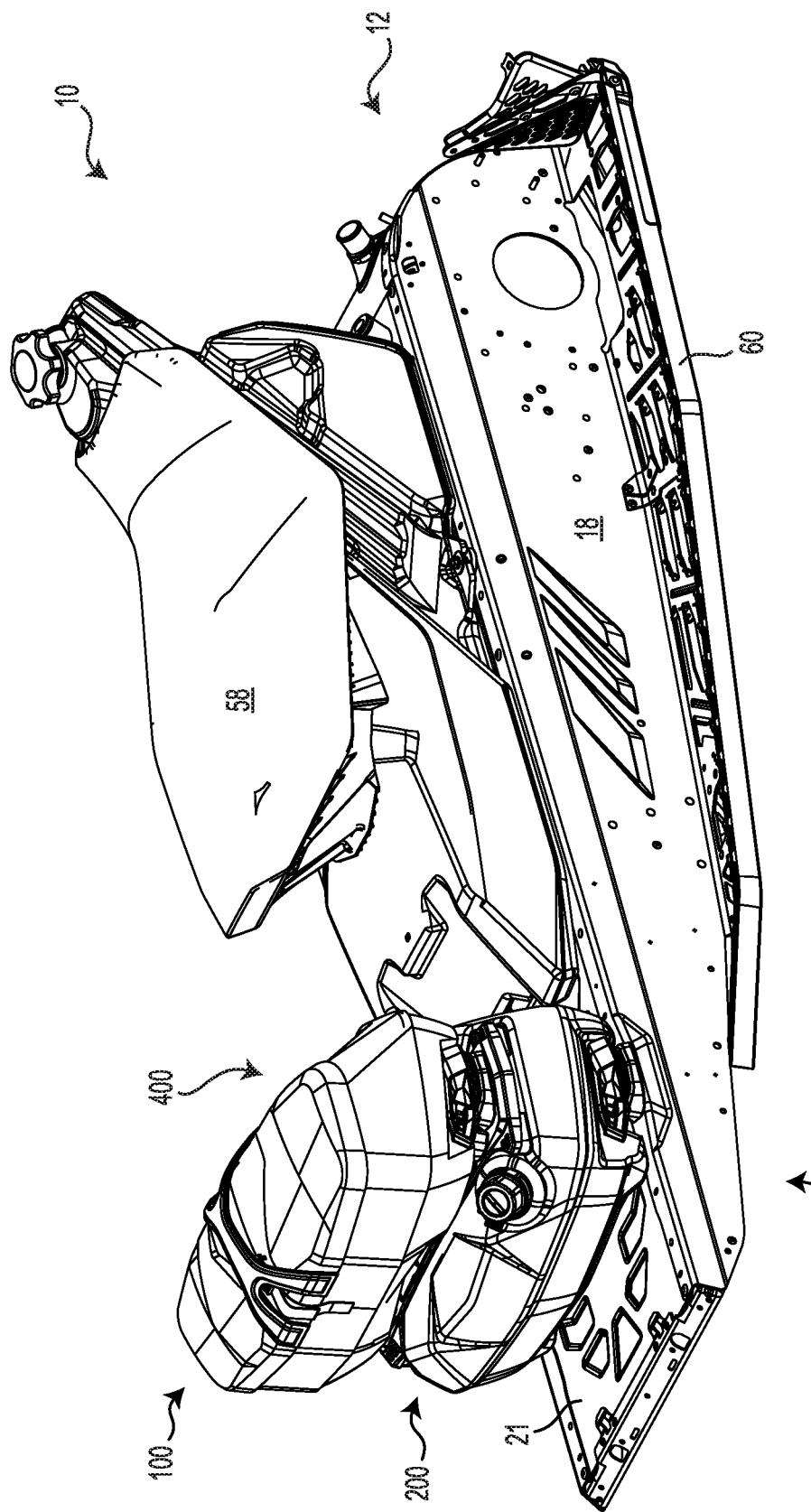
FIG. 2 is a top, rear, right side perspective view of a portion of the snowmobile of FIG. 1, showing a stackable container assembly secured to anchor fixtures on a tunnel of the snowmobile.
Figure 3:
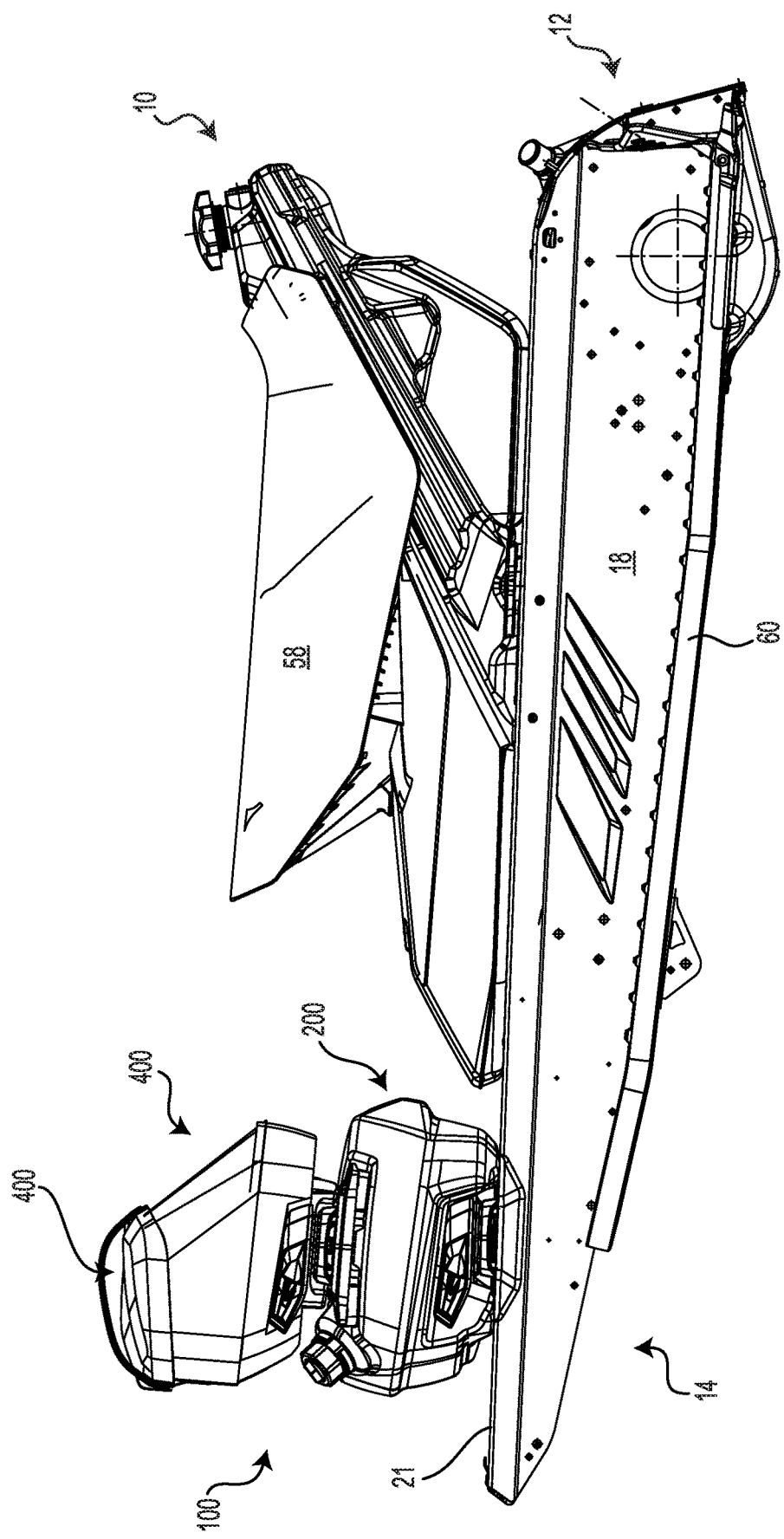
FIG. 3 is a right elevation view of the stackable container assembly and the portion of the snowmobile of FIG. 2.

An implementation of the present technology is illustrated by FIGS. 2 and 3, wherein a stackable container assembly 100 is connected to the snowmobile 10 rearward of the seat 58 on an upper surface 21 of the tunnel 18. The stackable container assembly 100 is made up of two containers for transport on the snowmobile 10: a base container 200 and an accessory container 400. The container 200 mounted directly on the tunnel 18 is referred to herein as the base container 200. For the illustrated implementation, the base container 200 is a jerry can 200. It is contemplated that the base container 200 could be another type of container other than the jerry can 200.

The jerry can 200 for transporting fuel is attached to the upper surface 21 of the tunnel 18. The accessory container 400, made for transporting objects, is stacked atop and attached to the jerry can 200. When connected together, a top side 412 of the accessory container 400 extends above the straddle seat 58, as seen in FIG. 3.

Figure 4A:
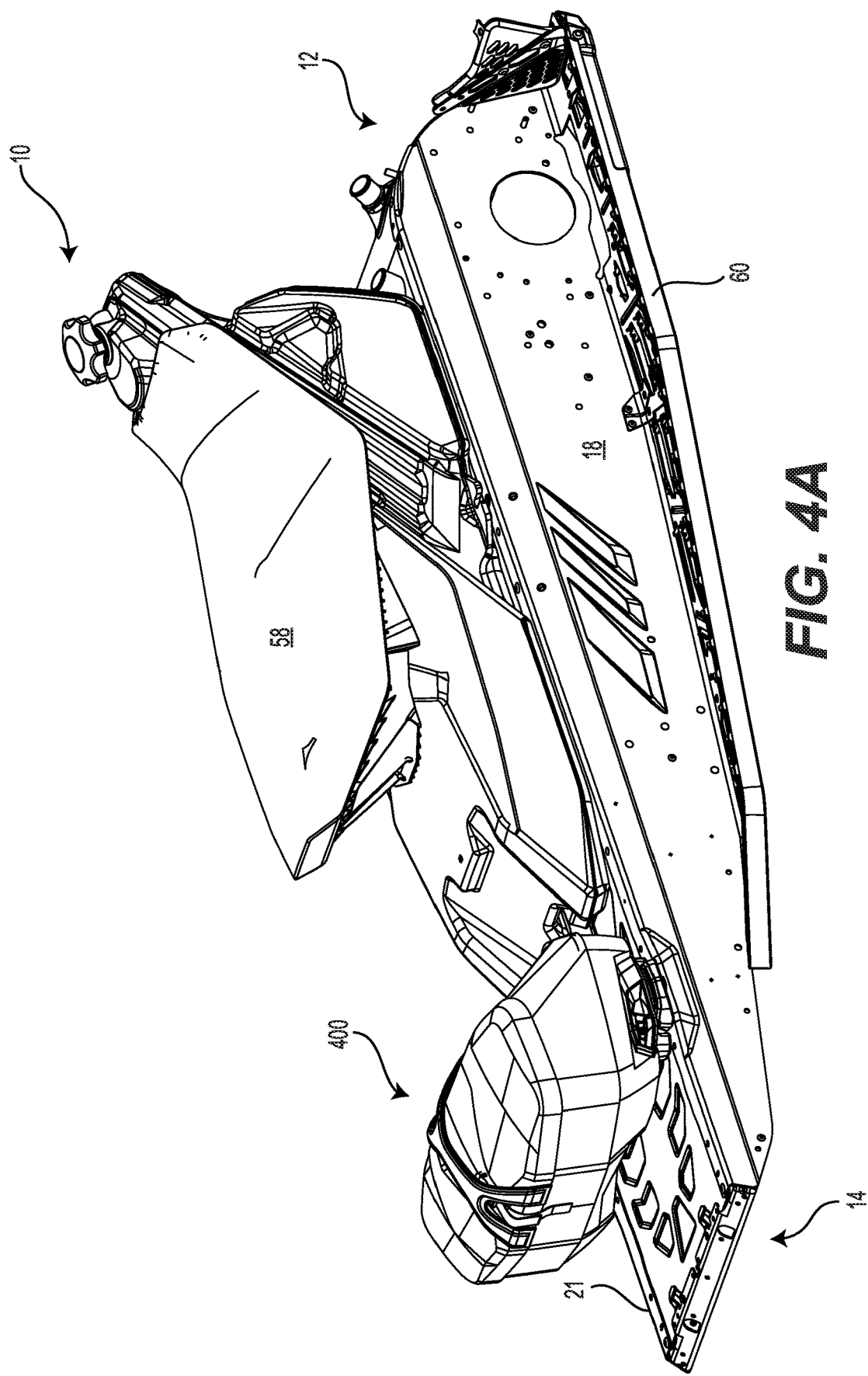
FIG. 4A is a top, rear, right side perspective view of the portion of the snowmobile of FIG. 2, showing an accessory container of the stackable container assembly secured to anchor fixtures on the tunnel of the snowmobile.
Figure 4B:
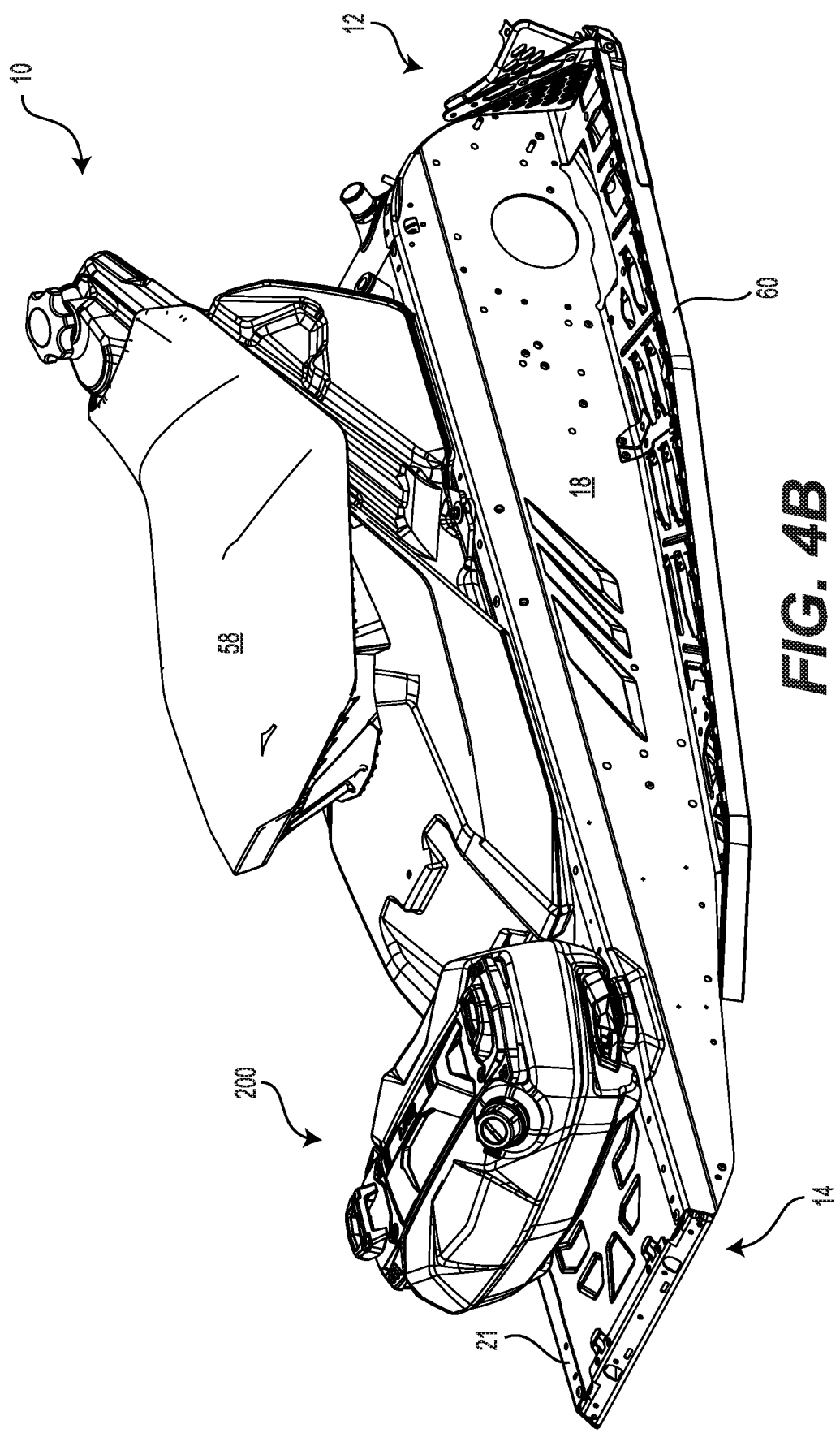
FIG. 4B is a top, rear, right side perspective view of the portion of the snowmobile of FIG. 2, showing a base container of the stackable container assembly secured to anchor fixtures on the tunnel of the snowmobile.
Figure 5:
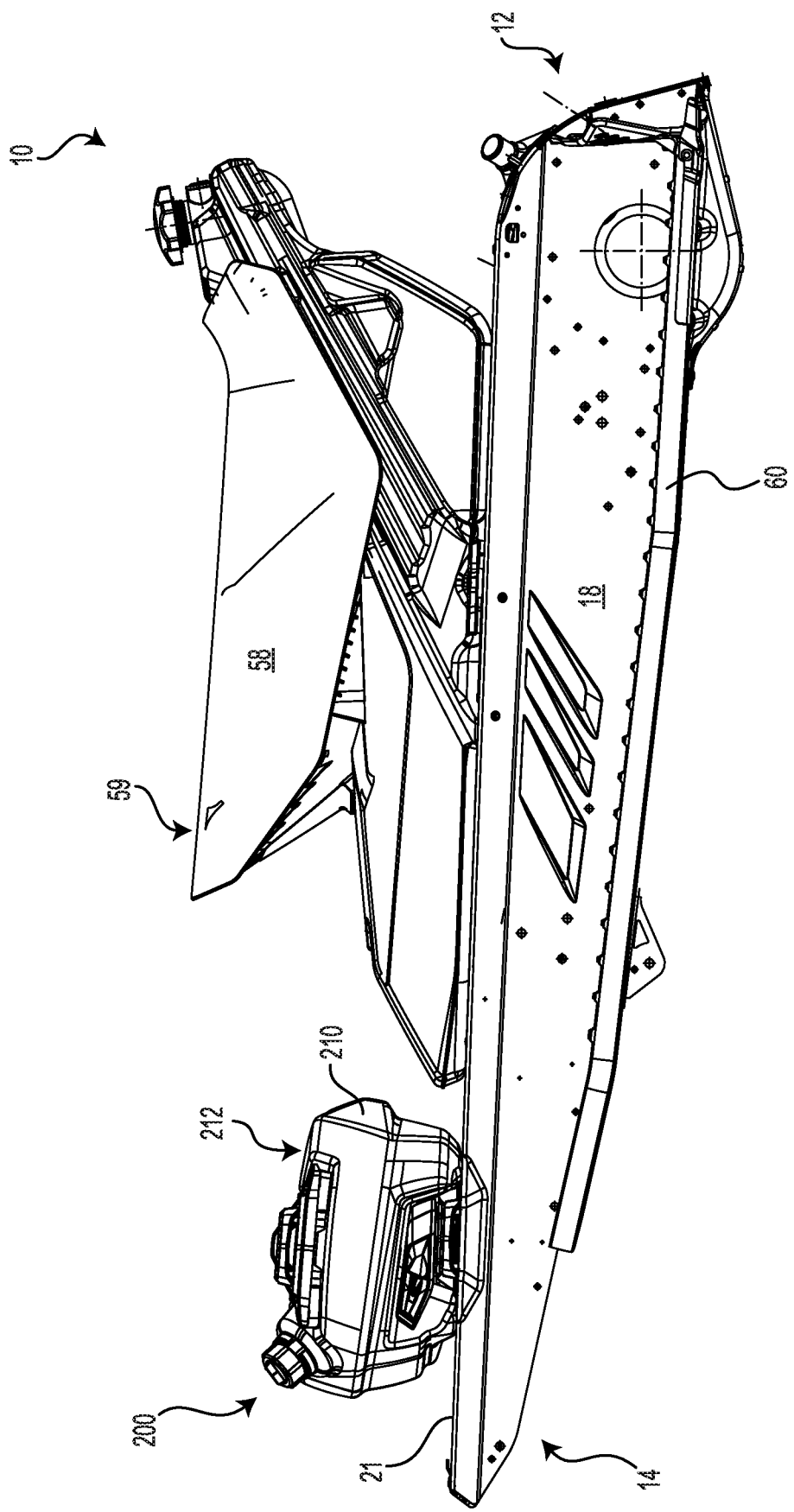
FIG. 5 is a right elevation view of the base container and the portion of the snowmobile for FIG. 4B.

As shown in FIGS. 4B and 5, the accessory container 400 can be removed from the jerry can 200, without having to remove the jerry can 200 from the snowmobile 10. As can be seen in FIG. 5, a top surface 59 of the straddle seat 58 extends above a top surface 212 of a container body 210 of the jerry can 200 when the jerry can 200 is mounted to the tunnel 18.

Figure 6:
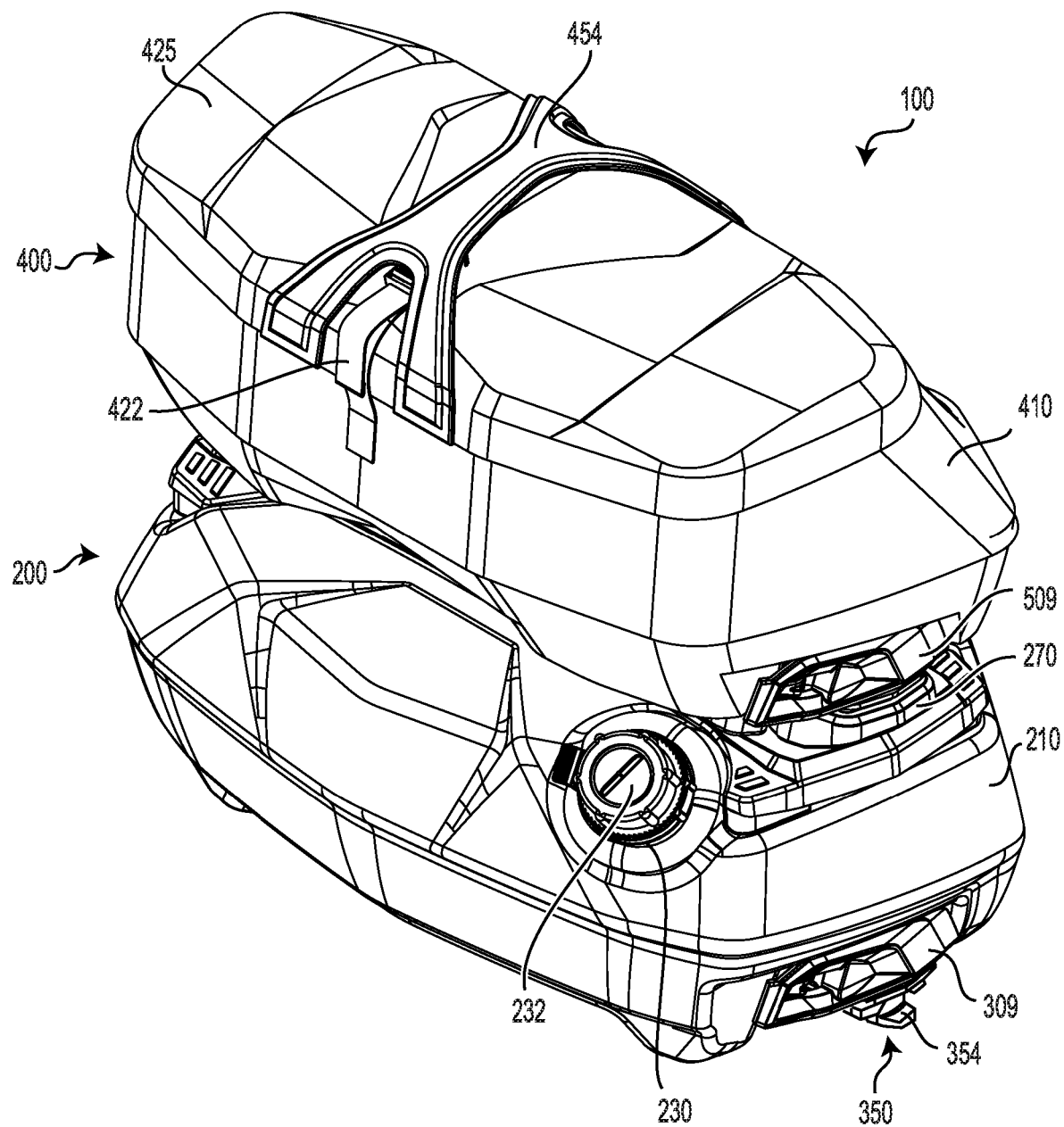
FIG. 6 is a top, rear, right side perspective view of the stackable container assembly of FIG. 2.
Figure 7:
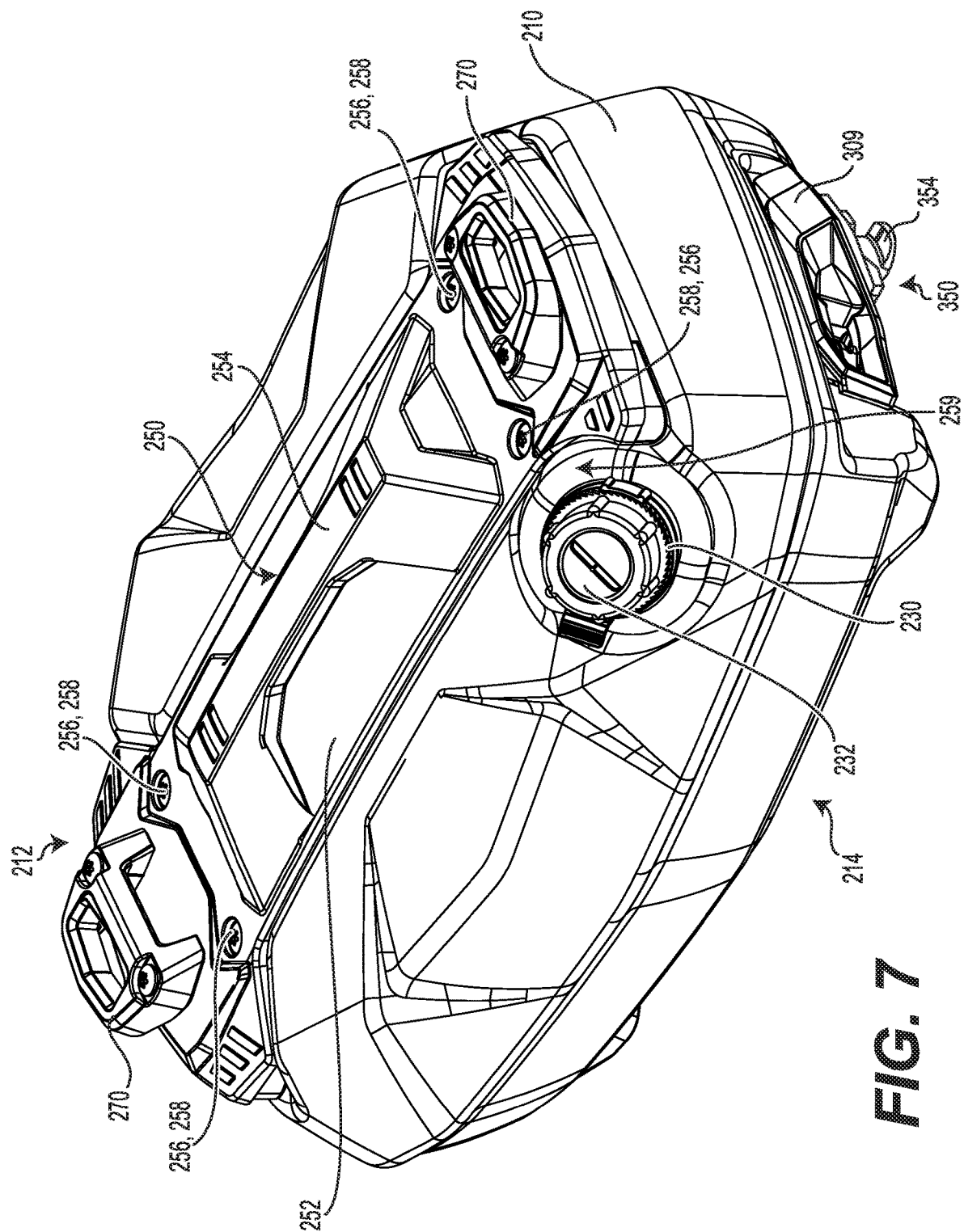
FIG. 7 is a top, rear, right side perspective view of the base container of the stackable container assembly of FIG. 6.
Figure 14:
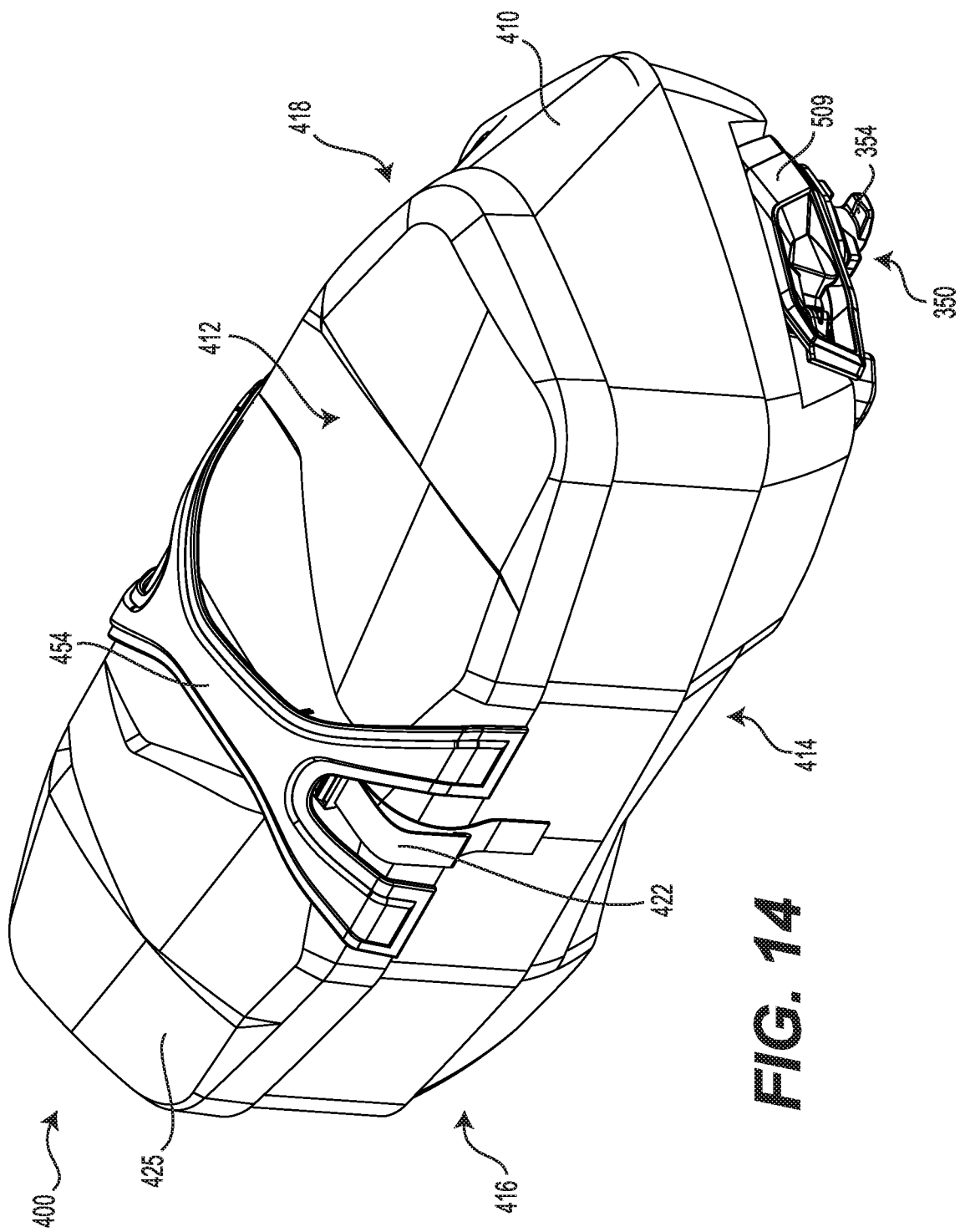
FIG. 14 is a top, rear, right side perspective view of the accessory container of the stackable container assembly of FIG. 6.
Figure 15:
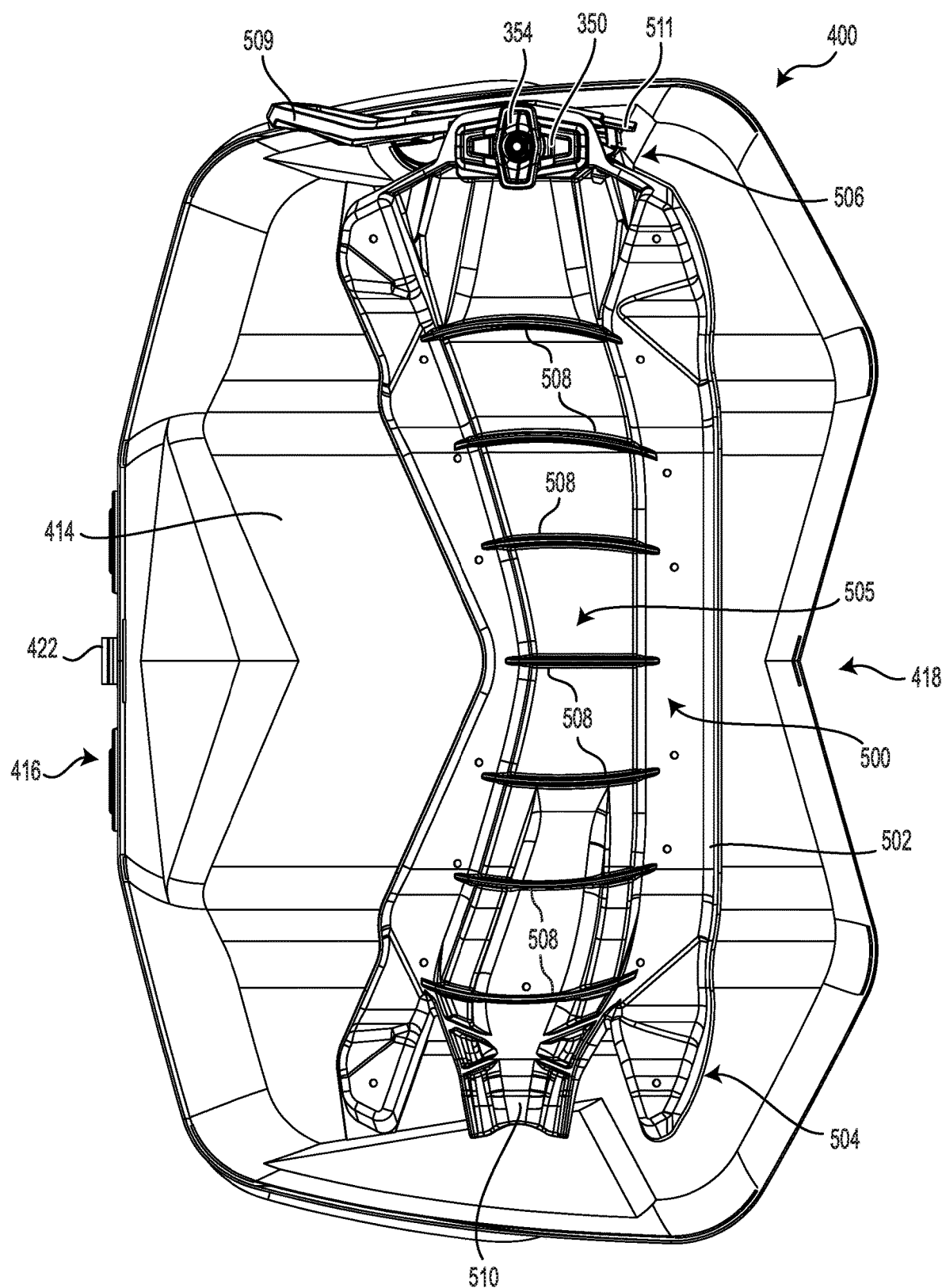
FIG. 15 is a bottom plan view of the accessory container of FIG. 14.

The two containers 200, 400 of the stackable container assembly 100 are shown connected together, but disconnected from the snowmobile 10, in FIG. 6. As shown in FIGS. 2 to 6, the containers 200, 400 of the container assembly 100 may be connected together and to the snowmobile 10 (FIGS. 2 and 3), connected together but not to the snowmobile 10 (FIG. 6), or the jerry can 200 could be connected to the snowmobile 10 without the accessory container 400 (FIGS. 4B and 5), or the accessory container 400 could be connected directly to the snowmobile 10 without the jerry can 200 (FIG. 4A). As seen in FIGS. 7 and 14, the containers 200, 400 can be fully separated from each other and the snowmobile 10 as well. The connection system utilized herein, which is described in more detail below, allows the containers 200, 400 of the stackable container assembly 100 to remain securely connected together and to the snowmobile 10 during operation. The system also allows a user of the assembly 100 to easily connect or separate the containers 200, 400 to or from each other or the snowmobile 10.

The jerry can 200 and its components are shown in FIGS. 6 to 13. The jerry can 200 is generally used for transporting fuel. The container body 210 is made of high density polyethylene plastic, which is stiff and impermeable. It is contemplated that other materials could be used, so long as they are appropriate for safely transporting fuel. Additionally, any material contemplated for the present implementation would need to be adequately stiff to support the accessory container 400 when it is stacked on top of the jerry can 200.

The jerry can 200 has a fluid filling neck 230 adapted for filling an interior of the container body 210 with fluid, such as fuel. There is also included a cap 232 to selectively close the neck 230. The cap 232 screws onto the neck 230. It is contemplated that the cap 232 could include a lock and key to secure the contents of the jerry can 200. In some implementations, the cap 232 could be tethered to the container body 210 so that the cap 232 cannot be accidently misplaced.

An attachment base 300 is used to selectively connect the jerry can 200 to the snowmobile 10. The attachment base 300 is connected to a bottom surface 214 of the container body 210 (see FIG. 9). The attachment base 300 has a frame 302 providing the structure of the attachment base 300. The frame 302 has several criss-crossing ribs 308 to help strengthen the attachment base 300. The frame 302 is generally flat, as seen for example in FIG. 11. It is contemplated that the frame 302 could have a different pattern of ribs 308, depending on the implementation. It is further contemplated that the frame 302 could be a solid plate without ribs 308.

At a right end portion 304 of the attachment base 300, there is provided an anchor 350 for connecting to an anchor fixture 270 on the snowmobile 10. At a left end portion 304 of the attachment base 300, there is a tongue 310 for connecting to another anchor fixture 270 on the snowmobile 10. The anchor 350 and the tongue 310 are integral to the frame 302 of the attachment base 300. It is contemplated however that the anchor 350 and/or the tongue 310 could be removably attached to the frame 302. More details of the anchor 350, the tongue 310, and the anchor fixtures 270 are provided further below.

A rubber strap 309 is provided on the frame 302 for covering the anchor 350 disposed on the right side portion 304. The strap 309 is attached to the frame 302 to one side of the anchor 350. The strap 309, when in a closed position, is hooked onto a tab 311 on the frame 302 on another side of the anchor 350. Greater functional details of the strap 309 will be described below with respect to the anchor 350. The strap 309 is made of rubber. It is contemplated, however, that the strap 309 could be made of any flexible material. It is also contemplated that the strap 309 could be detachable from the frame 309.

Four holes 320 are provided in the frame 302 for securing the attachment base 300 to the container body 210. Four screws 322 pass through the holes 320 to connect the frame 302 to the container body 210. It is contemplated that fasteners other than screws 322 could be used. It is also contemplated that more or fewer holes 320 and fasteners 322 could be used for connecting the attachment base 300 to the container body 210. It is further contemplated that the attachment base 300 could be integral to the container body 210.

A fixture assembly 250 (see FIGS. 7, 12 and 13) is connected to a top surface 214 of the jerry can 200. Specifically, a fixture plate 252 is connected to the top surface 214 of the container body 210 by four screws 256 passing through four holes 258 provided in the fixture plate 252. It is contemplated that other types of fasteners 256 could be used. It is also contemplated that more or fewer holes 252 and fasteners 252 could be used for connecting the fixture assembly 250 to the jerry can 200. It is also contemplated that the fixture assembly 250 could be integral to the container body 210.

The fixture assembly 250 includes two anchor fixtures 270 (removed in FIG. 13) for attaching the accessory container 400. The two anchor fixtures 270 are connected to the fixture plate 252 by two screws 274 at a right end portion 251 and a left end portion 253. The fixture assembly 250 also includes a handle 254 for carrying the jerry can 200. The handle 254 is integral to the fixture plate 252. It is contemplated that the form of the handle 254 could be different depending on the implementation. It is also contemplated that the fixture plate 252 could be integral to the container body 210. It is further contemplated that the anchor fixtures 270 could be integral to the fixture plate 252.

Figure 8:
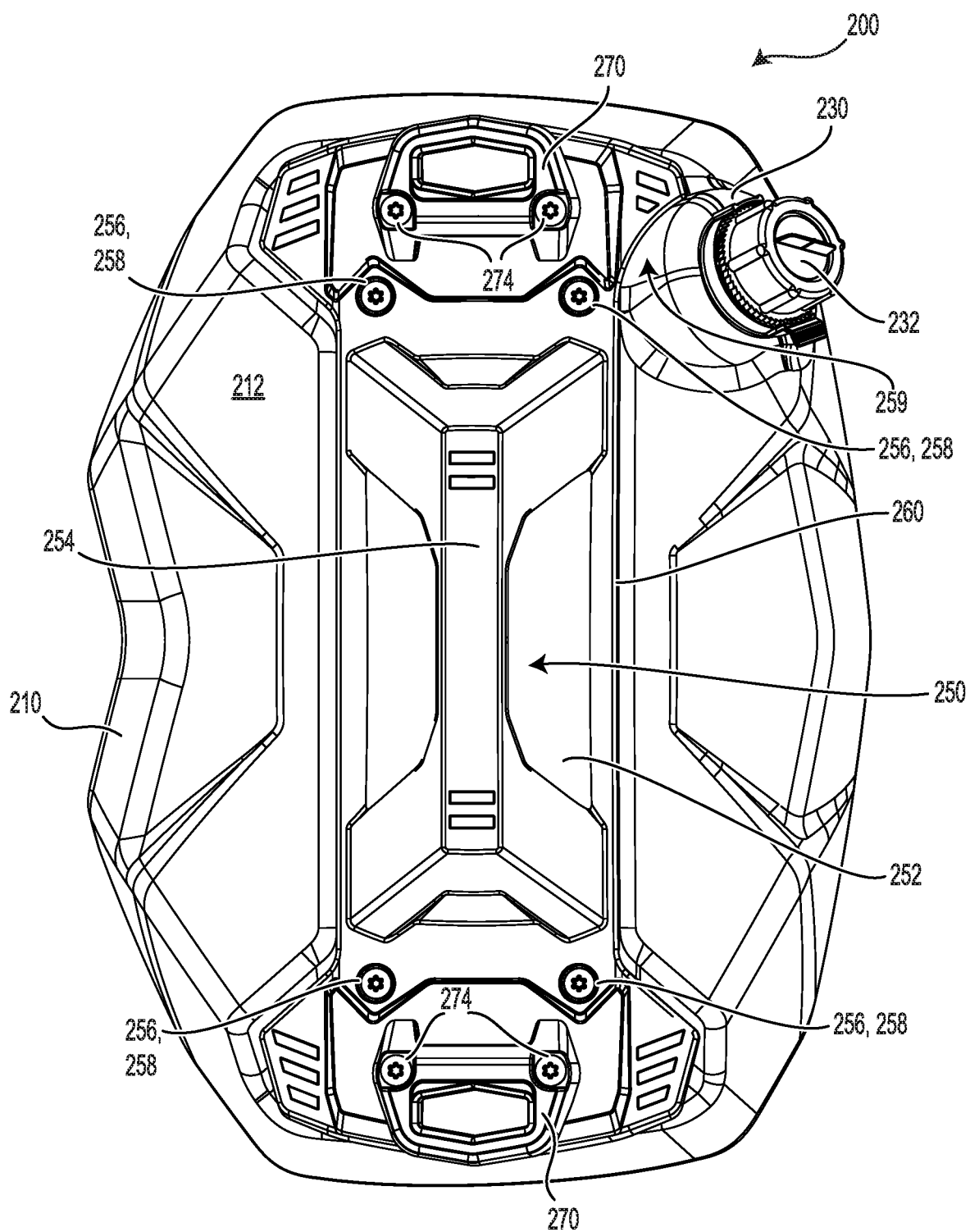
FIG. 8 is a top plan view of the base container of FIG. 7.
Figure 9:
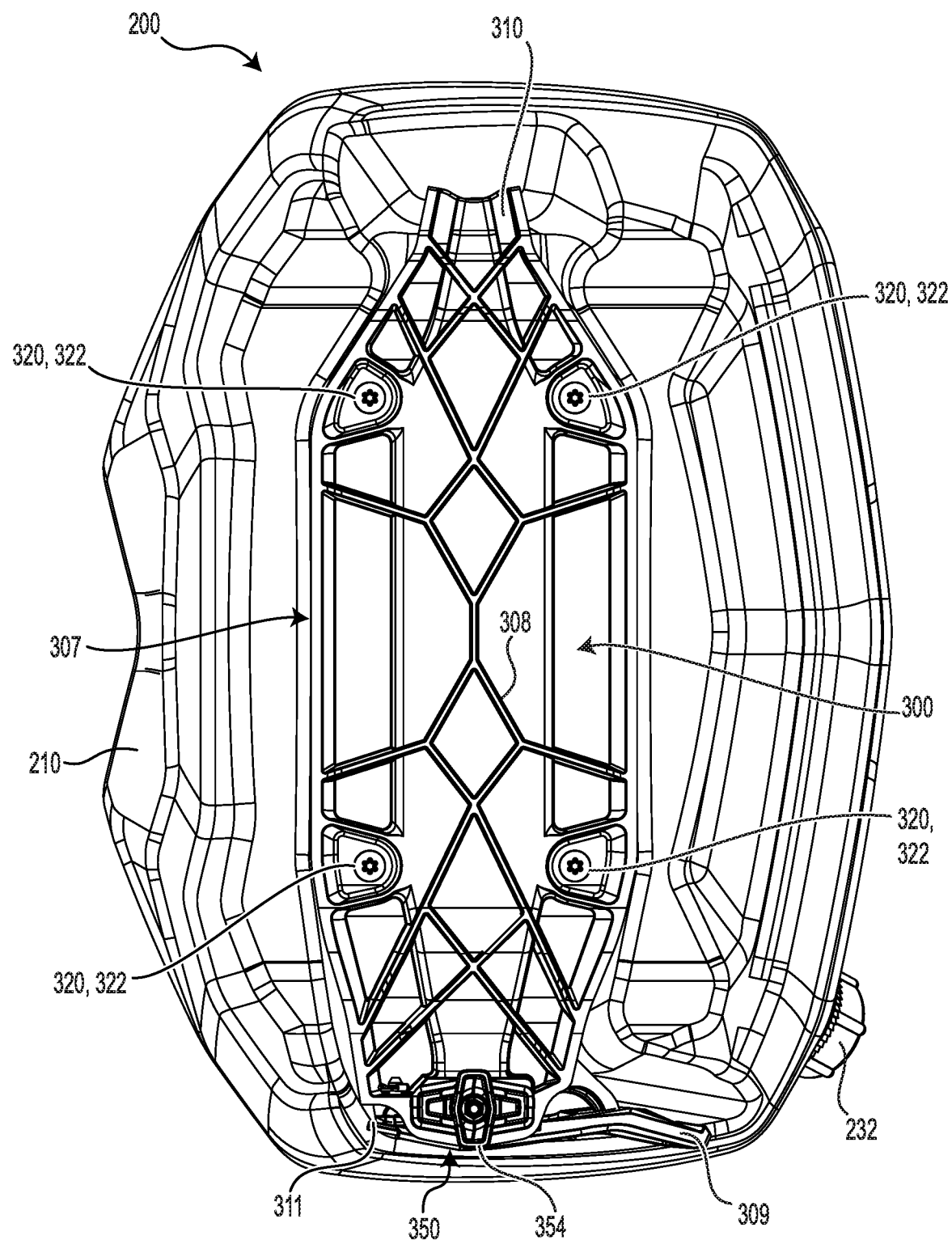
FIG. 9 is a bottom plan view of the base container of FIG. 7.

As seen in FIGS. 7 and 8, the fluid filling neck 230 extends at an angle upward from the container body 210. The fixture plate 250, see for example FIG. 12, includes a recessed portion 259 such that the neck 230 is outside an exterior edge 260 of the fixture plate 250. As seen in FIG. 6, this allows the cap 232 of the fluid filling neck 230 to be accessible when the stackable container assembly 100 is assembled together. As such, the cap 232 is removable even while the accessory container 400 is connected to the jerry can 200.

The accessory container 400 of the stackable container assembly 100 will now be described with respect to FIGS. 14 to 17. The accessory container 400 includes an accessory container body 410 for transporting objects. The accessory body 410 is made of a semi-rigid material for securely transporting objects on the snowmobile 10 during normal operation. It is contemplated, however, that many different materials may be used, including, but not limited to, canvas, leather, plastic, rubber, and metal. A lid 425 is hinged on a front side 418 of the accessory container body 410. It is contemplated that the lid 425 could be fully separable from the container body 410 in some implementations.

The lid 425 includes a handle 454 for carrying the accessory container 400. The handle 454 is made of the same semi-rigid material as the accessory container body 410. It is contemplated that the material of the handle 454 could be different than that of the accessory container body 410. It is further contemplated that the handle 454 could be attached to the accessory container body 410 instead of the lid 425.

A clasp 422 included on the accessory container 400 secures the lid 425 in a closed position. It is contemplated that the clasp 422 could be replaced with different mechanisms for keeping the lid 425 closed, including, but not limited to: a Velcro™ connecting strap, a latch, a hook and eye clasp, and a toggle clasp. It is also contemplated that the lid 425 could include a lock and key system to secure the contents of the accessory container 400.

Figure 16:
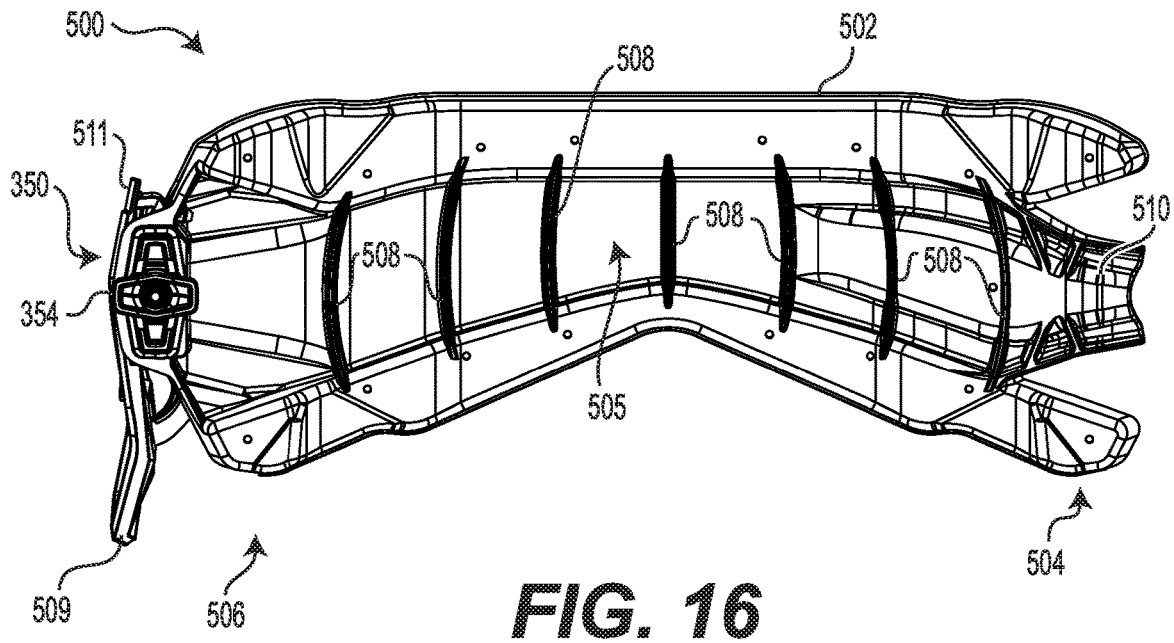
FIG. 16 is a bottom plan view of an accessory base and an anchor of the accessory container of FIG. 14.
Figure 17:
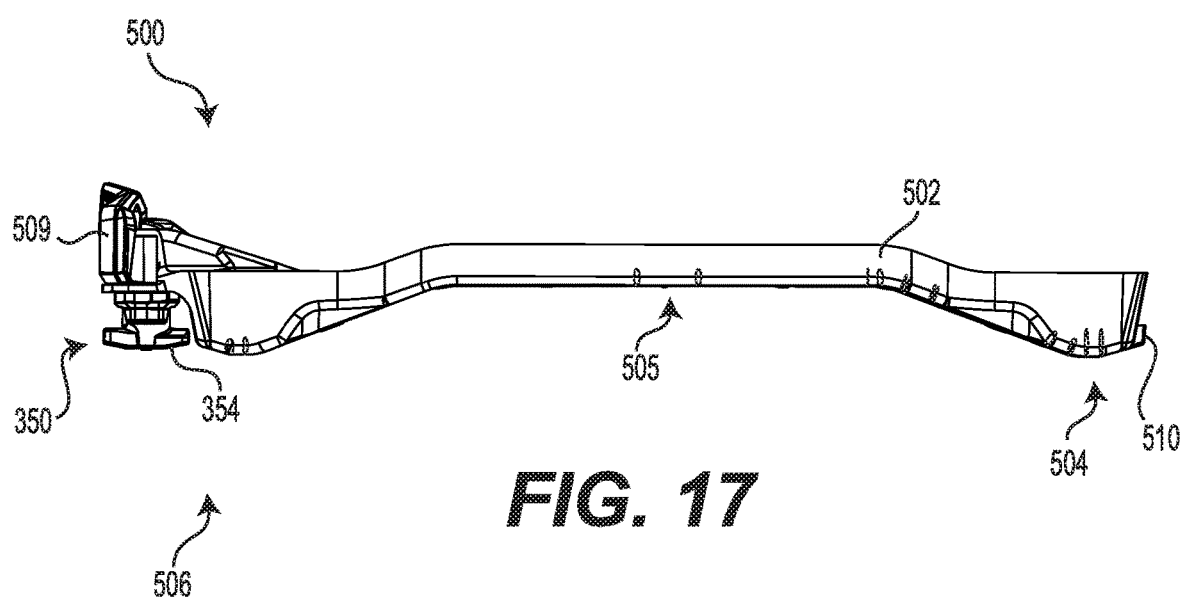
FIG. 17 is a front elevation view of the accessory base and the anchor of FIG. 16.

The accessory container 400 has an accessory base 500 attached to a bottom surface 414 of the accessory container body 410 which is illustrated in FIGS. 16 and 17. The accessory base 500 is configured to connect to the fixture assembly 250 of the jerry can 200 when the accessory container 400 is stacked on top of the jerry can 200. The accessory base 500 has an accessory frame 502 to provide structure. The accessory frame 502 includes curved ribs 508 to provide additional strength to the accessory frame 502. It is contemplated that the ribs 508 could be more or less curved. It is also contemplated that the accessory frame 502 could be made without the ribs 508. It is further contemplated that the accessory frame 502 could be integral to the accessory container body 410.

One anchor 350 is attached to the accessory base 500 at a right end portion 506 of the frame 502. A tongue 510 is connected to the accessory base 500 at a left end portion 504 of the frame 502. The tongue 510 is a toe-in holder similar to the tongue 310 of the attachment base 300 and its use will be described in more detail below. The anchor 350 and the tongue 510 are integral to the frame 502 of the accessory base 300. It is contemplated however that the anchor 350 and/or the tongue 510 could be removably attached to the accessory frame 502.

Figure 11:
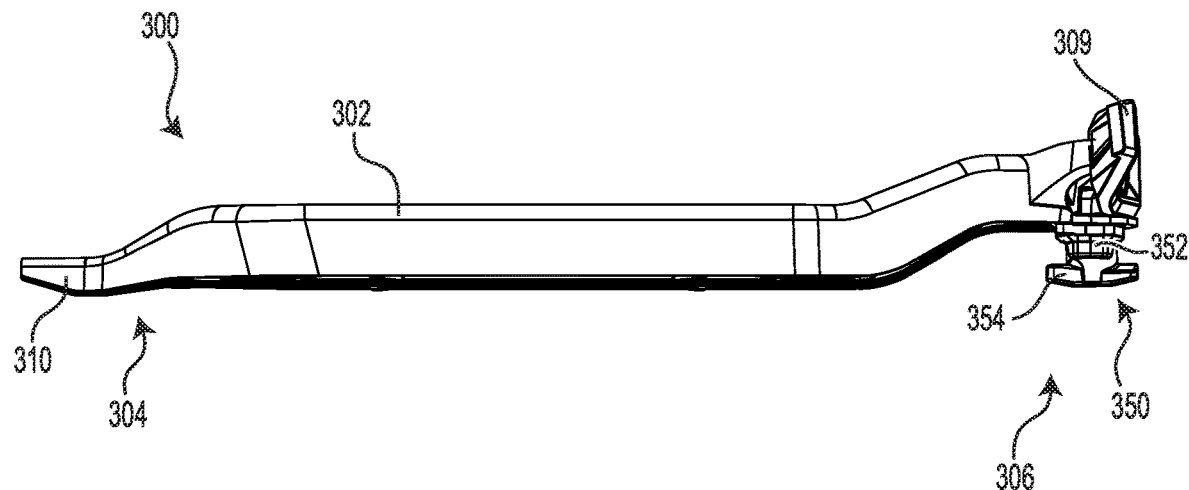
FIG. 11 is a rear elevation view of the attachment base and the anchor of FIG. 10.
Figure 12:
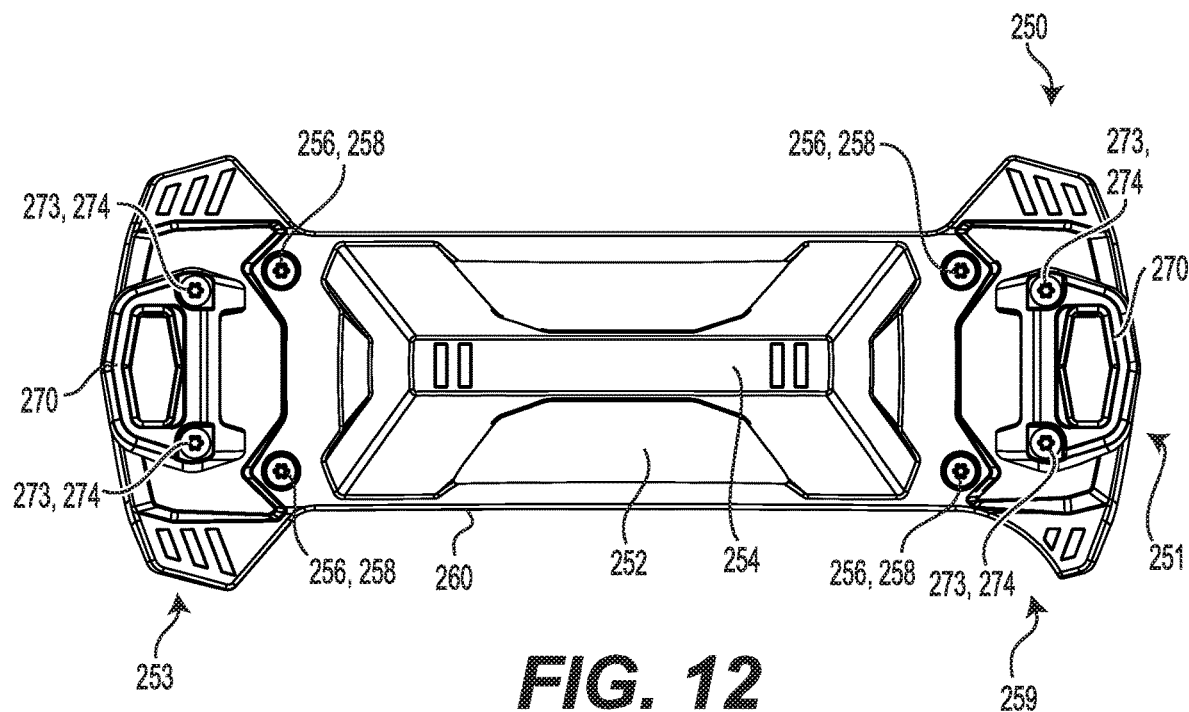
FIG. 12 is a top plan view of a fixture assembly of the base container of FIG. 7.
Figure 13:
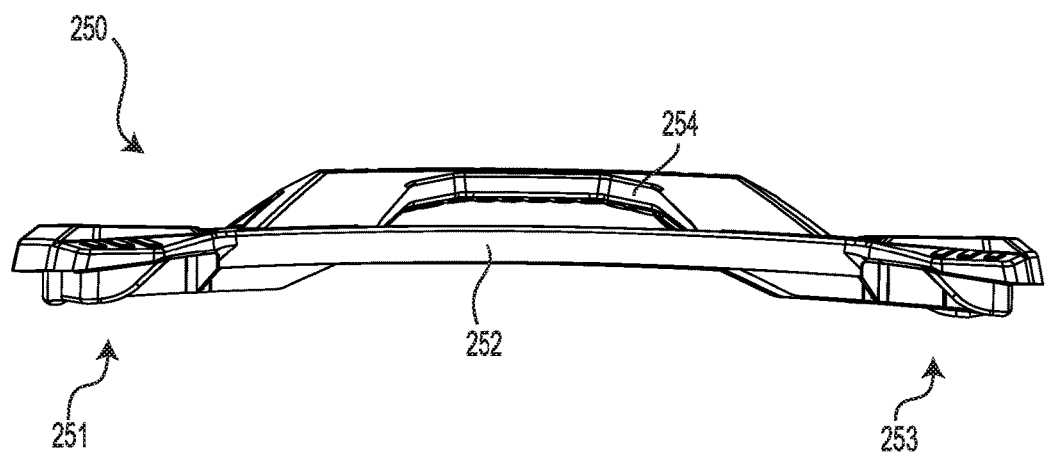
FIG. 13 is a front elevation view of the fixture assembly of FIG. 12.

In a center portion 505, the accessory base 500 is recessed so as to fit around the handle 254 of the jerry can 200 when the accessory container 400 is stacked on top of the jerry can 200 (FIG. 17). The attachment base 300 is, on the other hand, relatively flat (FIG. 11). The attachment base 300 has no recess for receiving the handle 454 of the accessory container 400 or the handle 254 of the jerry can 200.

A rubber strap 509 is provided on the frame 502 for covering the anchor 350 disposed on the right side portion 506. The strap 509 is attached to the frame 502 to one side of the anchor 350. The strap 509, when in a closed position, is hooked on to a tab 511 on the frame 502 on another side of the anchor 350. Greater functional details of the strap 509 will be described below with respect to the anchor 350. As with strap 309, the strap 509 is made of rubber but it is contemplated that the strap 509 could be made of any flexible material. It is also contemplated that the strap 509 could be detachable from the frame 509.

Figure 18:
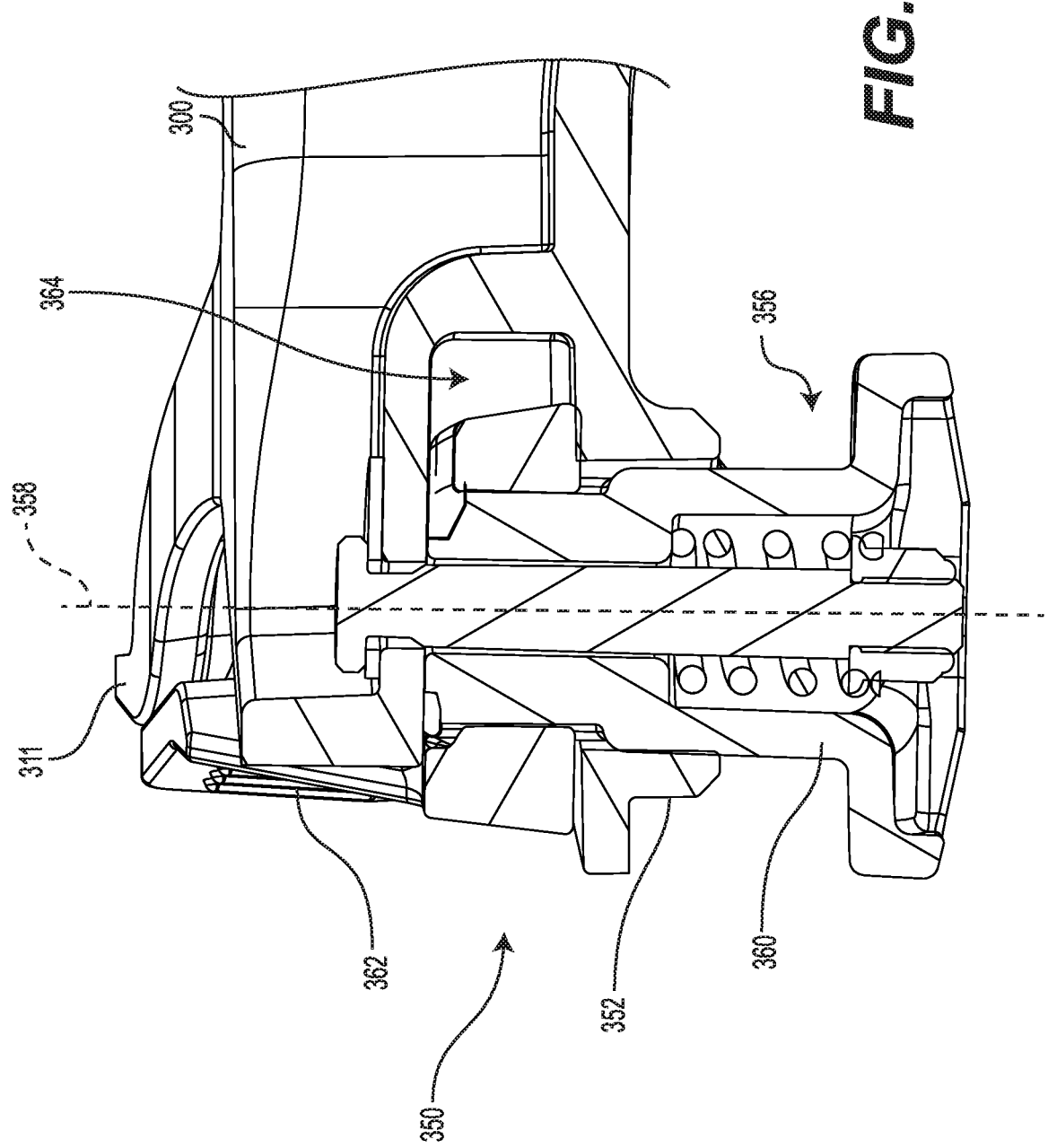
FIG. 18 is cross-sectional view of the attachment base and the anchor of FIG. 10 taken through line 18-18 of FIG. 10, with a strap covering a lever of the anchor removed for clarity.

An exemplary anchor 350 of the anchors 350 connected to the attachment base 300 and the accessory base 500 is illustrated in FIG. 18. The anchor 350 will be described with respect to the attachment base 300, however the anchor 350 of the accessory base 500 functions in an equivalent manner.

Figure 19A:
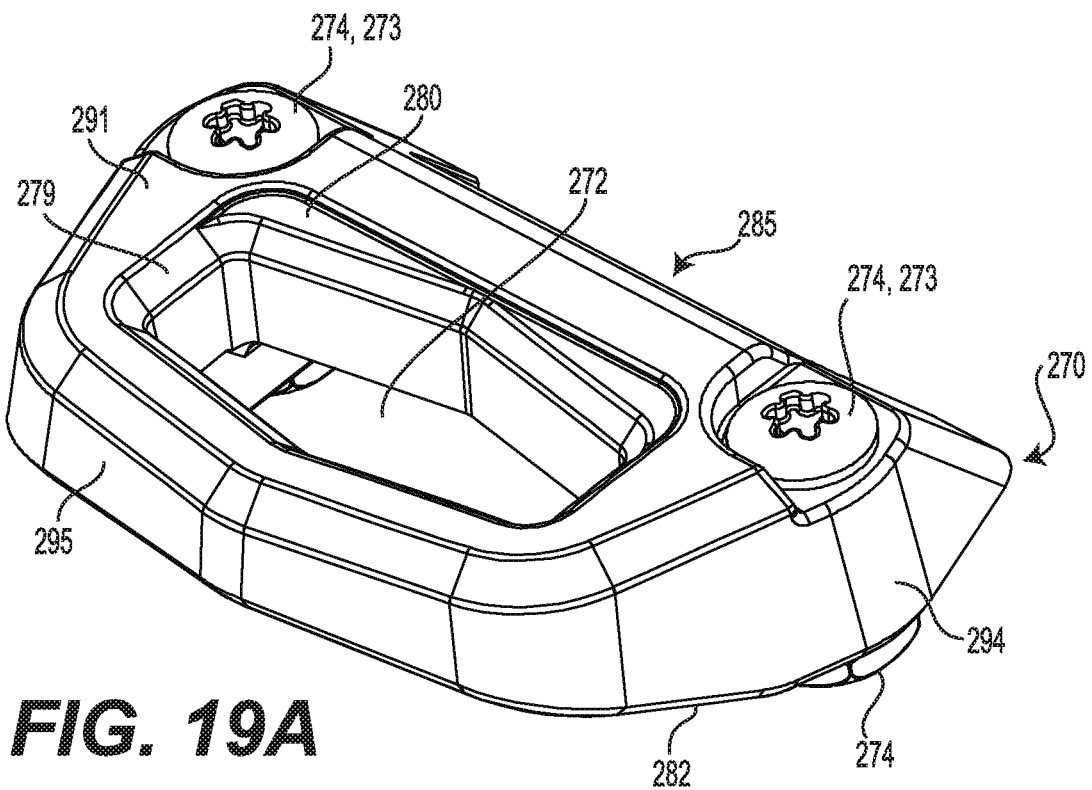
FIGS. 19A-19D are various close-up views of a left anchor fixture of the fixture assembly of FIG. 12.
Figure 19B:
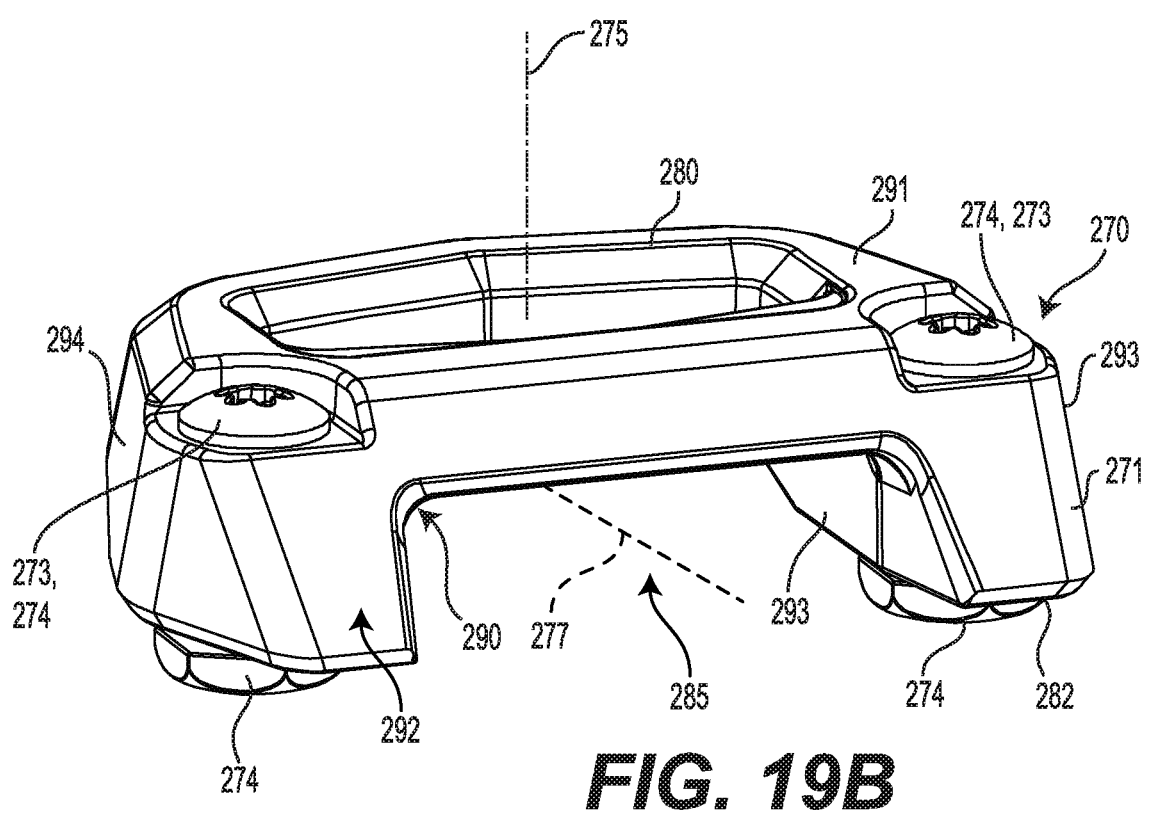
Figure 19C:
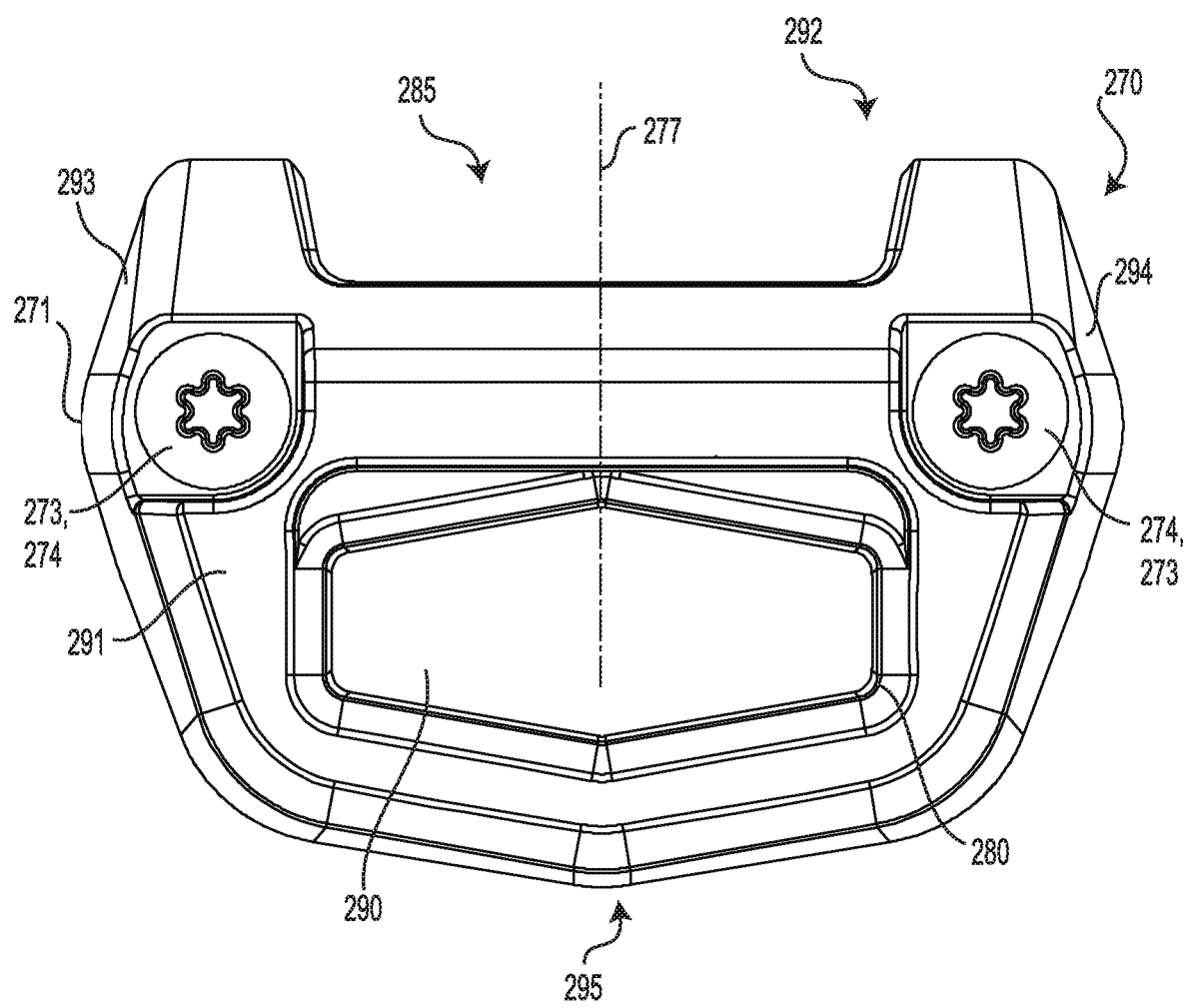
Figure 19D:
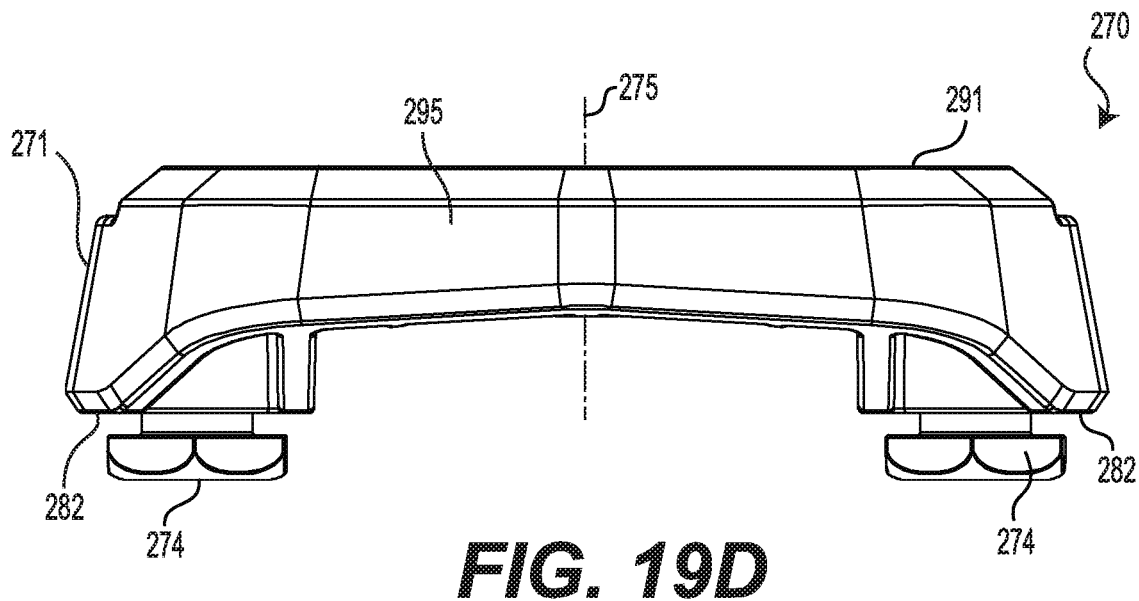

The anchor 350 includes an anchor base 352 integrally formed with the attachment base 300 and an anchor lock 354 extending from the anchor base 352. The anchor lock 354 and the anchor base 352 are separated by a space 356 wherein one or more surfaces can be held anchored together. The anchor base 352 and anchor lock 354 have an elongated shape. The anchor lock 354 is rotatable about an axis 358 perpendicular to the anchor base 352 between a locked position and an unlocked position that are separated by a quarter turn. In the unlocked position (shown in FIG. 20), the anchor lock 354 is disposed parallel to the anchor base 352, and in the locked position (shown in FIGS. 10, 11 and 18), the anchor lock 354 is disposed perpendicular to the anchor base 352. The anchor lock 354 extends from a stem 360 disposed along the axis 358. A lever 362 is rotatable about the axis 358 and is operatively connected to the anchor lock 354 to move the anchor lock 354 between the locked and unlocked positions. The end of the lever 362 that connects to the stem 360 is received in a space 364 defined in the attachment base 300. The locked and unlocked positions of the anchor 350 correspond to the anchor lock 354 being rotated by 90 degrees relative to the anchor base 352, and to the lever 362 being correspondingly turned by 90 degrees. It is contemplated that the anchor lock 354 could be turned by more or less than 90 degrees to engage an aperture 280 (see FIG. 19A) in one of the anchor fixtures 270. It is also contemplated that the lever 362 could be turned by a different angle than the anchor base 352 in order to move the anchor 350 between locked and unlocked positions.

The lever 362 is used to rotate the anchor lock 354 between the locked position and unlocked position as mentioned above. In the unlocked position of the anchor 350, the open lever 362 extends outwards from the frame 302. The lever 362 is turned in the groove 328 (FIG. 20) provided in the frame 302 for the lever 362 to lock the anchor 350. In the locked position of the anchor 350, the closed lever 362 is disposed adjacent to the frame 302 in the groove 328 and not extending outwards as in the unlocked position. Thus, when the anchor 350 is locked, the lever 362 is less likely to be accidentally pushed keeping the anchor 350 securely in the locked position. U.S. Pat. No. 8,777,531 B2, published on Jul. 15, 2014, the entirety of which is incorporated herein by reference, provides additional details regarding anchors similar in construction to the anchor 350.

With reference to FIGS. 19A through 19D, details of the anchor fixtures 270 used to connect the jerry can 200 to the snowmobile 10, as well as the accessory container 400 to the jerry can 200, will now be discussed. The left anchor fixture 270 is illustrated in FIGS. 19A to 19D and will be described herebelow. The right anchor fixture 270 is a mirror image of the left anchor fixture 270.

The anchor fixture 270 has a fixture body 271 with top 291, right side 292, front 293, rear 294 and left side 295 portions, each portion having an interior and an exterior surface. The fixture body 271 also has a base 282. An anchor aperture 280, designed for an anchor 350 to be inserted into, is defined through the top portion 291 of the anchor fixture 270. The anchor aperture 280 leads downwards through the top portion 291 to an anchor chamber 290. The anchor chamber 290, below the anchor aperture 280, extends outwards towards the right side surface 292. A fastener aperture 285, designed for the insertion of the tongue fasteners 310 or 510, is defined in the right side surface 292. A pair of fasteners 274 inserted through a pair of fastener holes 273 in the fixture body 271 are used to secure the fixture 270 into fastener holes (not shown) defined in the top surface 21 of the tunnel 18 of the snowmobile 10 or in the fixture plate 252 of the jerry can 200. It is contemplated that fastener holes could be provided on another type of vehicle for implementing the stackable container assembly 100 thereupon.

The central axis 277 of the fastener aperture 285 (axis normal to the fastener aperture 285) is perpendicular to the central axis 275 of the anchor aperture 280 (axis perpendicular to the anchor aperture 280) and parallel to the base 282. It is contemplated that the central axes 277, 275 could be disposed at other angles to each other and to the anchor fixture base 282.

The elongated anchor lock 354 of the anchor 350 shown in FIG. 18 is inserted into the anchor chamber 290 through the anchor aperture 280 of the top portion 291. The anchor lock 354 selectively engages the bottom surface of the side portions 295 and the bottom surface of the side portion 292 (i.e. the surface defining a top of the aperture 285) when rotated between the unlocked position and the locked position. The anchor aperture 280 is elongated to allow insertion of the elongated anchor lock 354 into the anchor chamber 290, and the anchor chamber 290 extends outwards from the anchor aperture 280 to allow rotation of the elongated anchor lock 354 within the anchor chamber 290. It is contemplated that in some implementations the anchor 350 could be a separate element used in cooperation with the anchor fixture 270. In such an implementation, the attachment base 300 could have a hole adapted for receiving the anchor 350, the anchor 350 connecting to the anchor fixture 270 upon passing through the hole.

International Patent Publication No. WO 2012/002959 A1, published on 5 Jan. 2012, the entirety of which is incorporated herein by reference, provides additional details regarding anchors and anchor fixtures similar in construction to the anchor 350 and the anchor fixture 270, and will not be discussed here in more detail.

Figure 20:
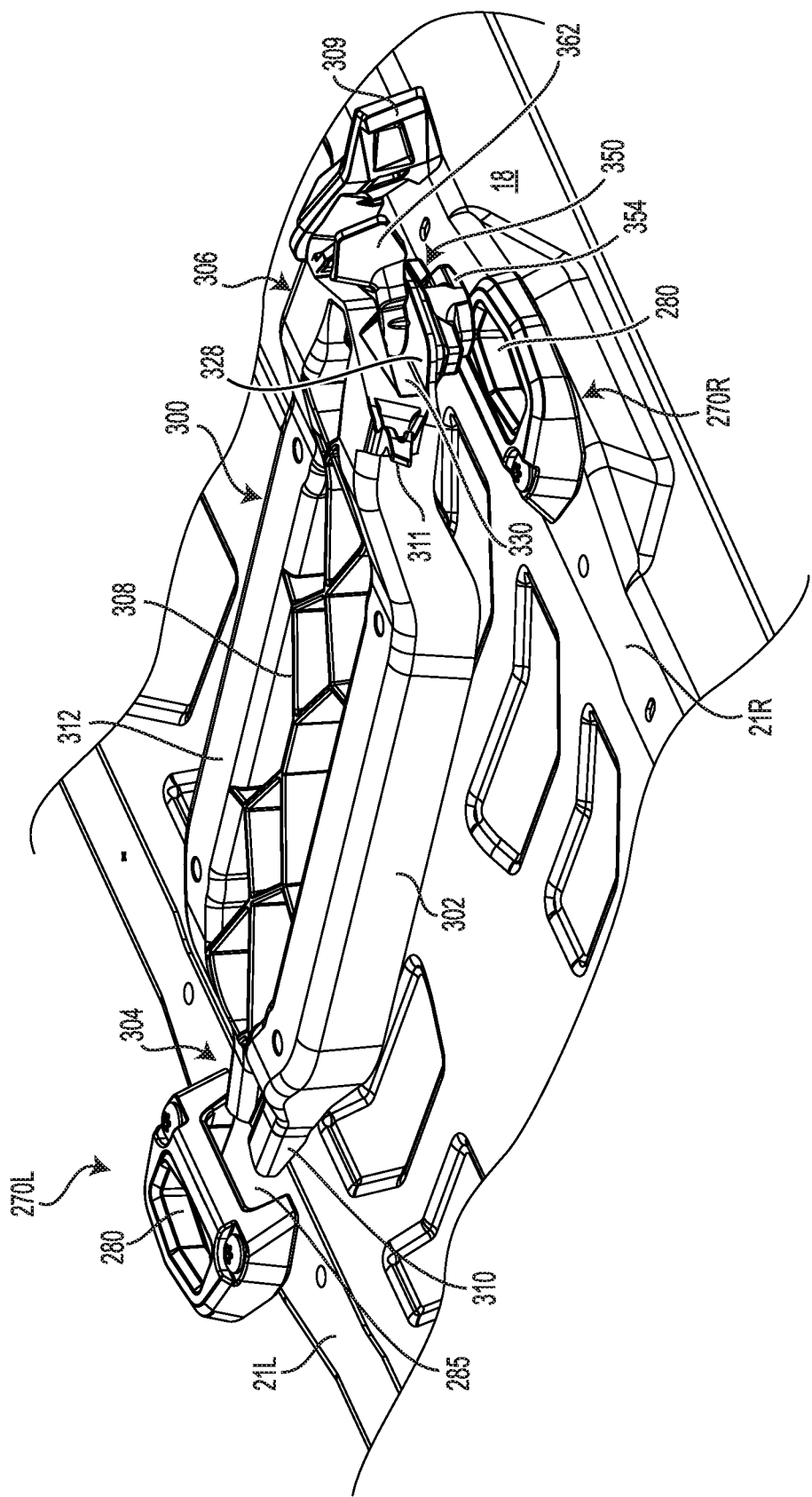
FIG. 20 is a rear, right side perspective view of a part of the tunnel of the snowmobile of FIG. 1 showing the attachment base and the anchor of FIG. 10 with two anchor fixtures of FIGS. 19A to 19D for connecting the base container of FIG. 7.
Figure 21:
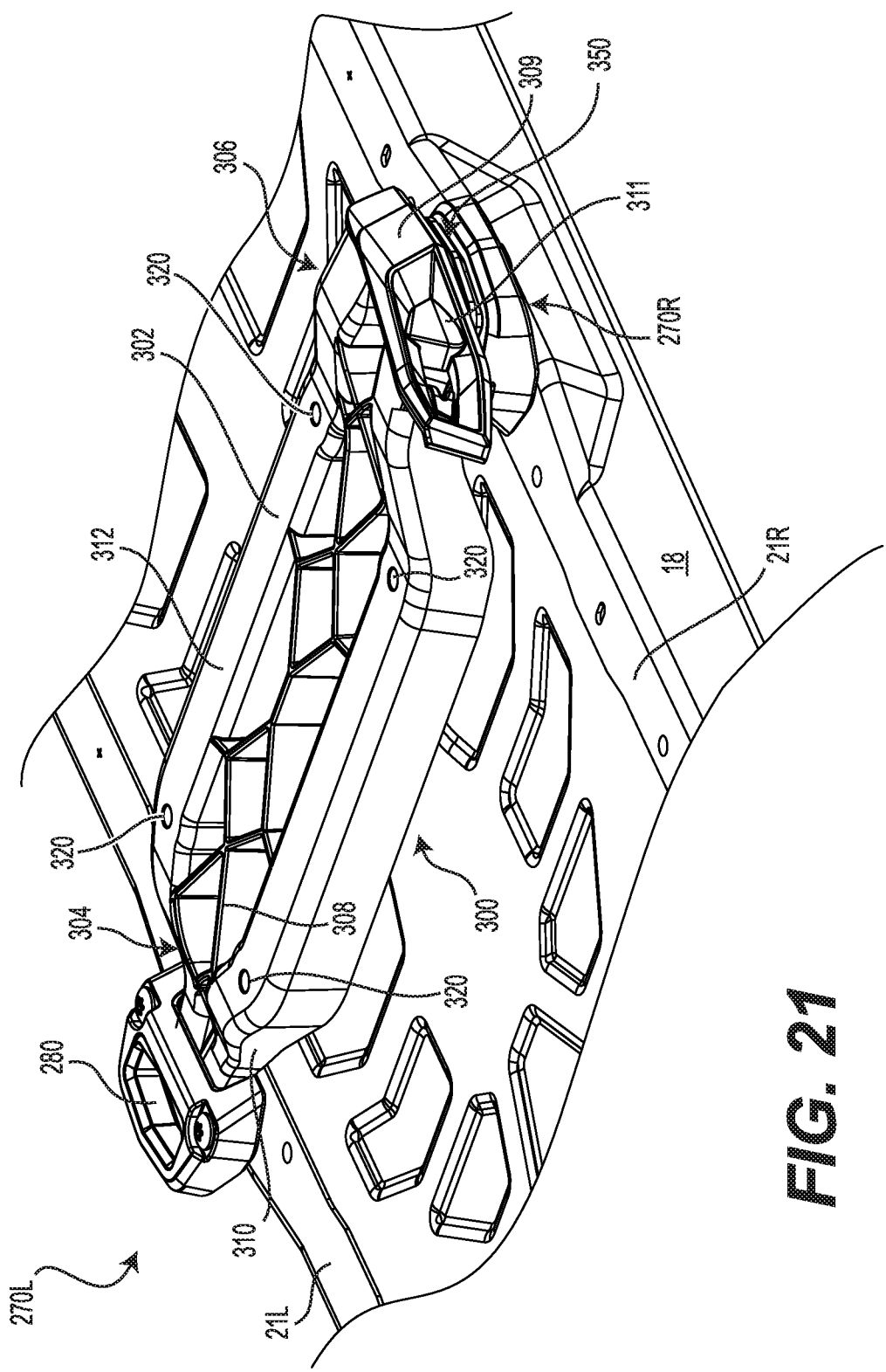
FIG. 21 is a rear, right side perspective view of the elements of FIG. 20 with the attachment base connected to the tunnel of the snowmobile.

Use of the anchor 350, the tongue 310, and the anchor fixtures 270 for attaching the jerry can 200 to the snowmobile 10 will now be described with reference to FIGS. 20 and 21. Using the anchor 350 and the tongue 510 of the accessory base 500 to connect the accessory container 400 to the jerry can 200 via the anchor fixtures 270 on the fixture assembly 250 works in the same way.

The attachment base 300 is connected to two oppositely facing anchor fixtures 270L, 270R on upper surfaces 21L, 21R on either side of the tunnel 18. These components can be seen just before connection in FIG. 20. The attachment base 300 is shown in isolation in FIGS. 20 and 21 for illustrative purposes. In normal operation, the attachment base 300 is connected to the jerry can 200 and the below described procedure is carried out with the jerry can 200 and the attachment base 300 connected together.

The tongue fastener 310 is first inserted into the fastener aperture 285 of the fixture 270L. The tongue fastener 310 is retained in the anchor chamber 280 by the edges of the aperture 285 allowing the attachment base 300 to be braced against the anchor fixture 270L while it is installed into the anchor fixture 270R. The anchor 350 at the end 306 of the attachment base 300 is then inserted into the anchor aperture 280 of the anchor fixture 270R with the anchor 350 disposed in an unlocked position. Once the anchor 350 is inserted and the lever 362 is turned to the locked position, the rubber strap 309 is extended over the lever 362 and attached to the hook 311 on the other side of the anchor 350 as seen in FIG. 21.

Figure 10:
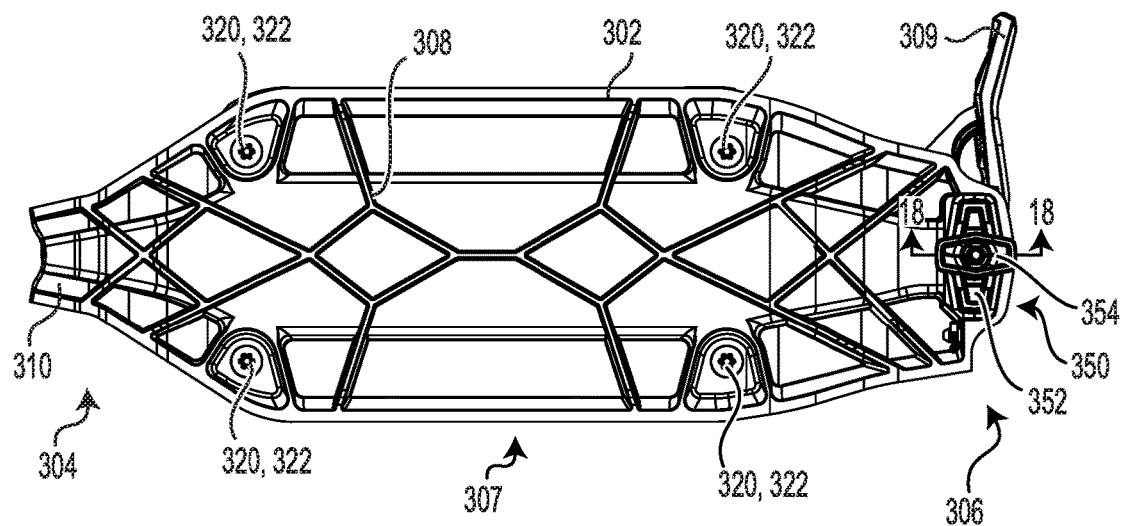
FIG. 10 is a bottom plan view of an attachment base and the anchor of the base container of FIG. 7.

As described above and with reference to FIGS. 20 and 21, the strap 309 is provided on the frame 302 and attached thereto on one side of the anchor 350. The strap 309 is extended over the closed lever 362 and hooked to a tab 311 on the frame 302 on the other side of the anchor 350. In FIG. 21, the anchor 350 is in a locked position, the lever 362 is closed, and the strap 309 is attached over the anchor 350. When the lever 350 is unlocked, the strap 309 is left hanging loosely from the frame 302, as seen in FIGS. 10 and 20, and thereby providing a noticeable visual indication that the anchor 350 is unlocked.

As the anchor fixtures 270 accept both tongues 310, 510 and the anchors 350, the containers 200, 400 can be attached in either orientation. While shown with the neck 230 of the jerry can 200 and the clasp 422 of the accessory container 400 accessible from the rear side 14 of the snowmobile 10, the containers 200, 400 could be installed facing different directions. For example, the position of the jerry can 200 could be reversed, while the accessory container 400 could remain in the illustrated position. It is contemplated that the position of either or both of the container 200, 400 could be reversed.

While the installation of the jerry can 200 onto the tunnel 18 of the snowmobile 10 was described with respect to only the jerry can 200, the accessory container 400 could be installed on the jerry can 200 before mounting the combined assembly 100 to the snowmobile 10. Similarly, the assembly 100 could be removed from the snowmobile 10 without separating the containers 200, 400. It is contemplated that the user could keep the containers 200, 400 connected for transport even when disconnected from the snowmobile, such that the user would carry the stacked container assembly 100 by the handle 454 of the accessory container 400.

The stackable container assembly 100, along with the anchor fixtures 270 to which they are connected, have been described exemplarily for attaching to the tunnel 18 of the snowmobile 10, however, it is contemplated that the fixtures 270 could be used with any surfaces disposed at other angles and in different locations in the snowmobile 10 or in vehicles other than a snowmobile for connecting the stackable container assembly 100. The fixtures 270 and the anchors 350 could be used for a wide range of accessories not limited to the ones described herein.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A stackable container assembly comprising:
  a base container comprising:
    a container body having a top surface and a bottom surface,
    the bottom surface being configured for connecting the base container to a vehicle;
    a tongue connected to the container body and being configured for inserting into a first vehicle anchor fixture connected to the vehicle, at least a portion of the tongue extending parallel to the bottom surface; and
    an anchor connected to the container body and being configured for inserting into a second vehicle anchor fixture,
    the anchor comprising:
      an anchor base being connected to the bottom surface of the container body,
      at least one anchor lock extending from the anchor base, the at least one anchor lock extending parallel to the bottom surface of the container body, and
      a stem extending downward from the bottom surface, the at least one anchor lock being connected to and extending from the stem; and
  an accessory container comprising:
    an accessory body having an accessory bottom surface for selectively connecting the accessory container to the top surface of the base container such that the accessory container is stacked on top of the base container.

2. The stackable container assembly of claim 1, wherein the tongue and the anchor are disposed on opposite sides of the container body.

3. The stackable container assembly of claim 1, further comprising a fixture assembly attached to the top surface of the container body, the fixture assembly being configured for receiving the accessory container; and
  wherein the fixture assembly comprises:
    a fixture plate; and
    at least one anchor fixture connected to the fixture plate.

4. The stackable container assembly of claim 3, wherein the fixture assembly is removable from the base container.

5. The stackable container assembly of claim 3, wherein:
  the fixture plate includes a handle; and
  the bottom surface of the accessory body is configured for receiving the handle attached to the fixture plate when the accessory container is connected to the base container.

6. The stackable container assembly of claim 1, wherein, when the anchor is inserted in the second vehicle anchor fixture, the stem passes through an aperture of the second vehicle anchor fixture.

7. A vehicle comprising:
  a first vehicle anchor fixture and a second vehicle anchor fixture;
  a base container connected to the first and second vehicle anchor fixtures, the base container comprising:
    a container body having a top surface and a bottom surface,
    the bottom surface being selectively connected to the first and second vehicle anchor fixtures;
    a tongue connected to the container body and being selectively inserted into the first vehicle anchor fixture, at least a portion of the tongue extending parallel to the bottom surface of the container body; and
    an anchor connected to the container body and being selectively inserted into the second vehicle anchor fixture,
    the anchor comprising:
      an anchor base being connected to the bottom surface of the container body,
      at least one anchor lock extending from the anchor base, the anchor lock extending parallel to the bottom surface of the container body, and
      a stem extending downward from the bottom surface, the at least one anchor lock being connected to and extending from the stem; and an accessory container comprising:
an accessory body having an accessory bottom surface for selectively connecting the accessory container to the top surface of the base container such that the accessory container is stacked on top of the base container.

8. The vehicle of claim 7, wherein the vehicle is a snowmobile comprising:
a frame including a tunnel, the first and second vehicle anchor fixtures being connected to a top side of the tunnel;
a motor connected to the frame;
a drive track disposed at least in part under the tunnel, the drive track being operatively connected to and driven by the motor;
at least one ski operatively connected to the frame; and
a straddle seat disposed above the tunnel; and
wherein:
the accessory container extends at least partially above the straddle seat when the accessory container is connected to the base container; and a top surface of the straddle seat extends above the top surface of the container body of the base container.

9. The vehicle of claim 7, wherein the stem passes through an aperture of the second vehicle anchor fixture.

10. The vehicle of claim 7, further comprising a fixture assembly attached to the top surface of the container body, the fixture assembly being configured for receiving the accessory container; and
wherein the fixture assembly comprises:
a fixture plate; and
at least one anchor fixture connected to the fixture plate.

11. The vehicle of claim 10, wherein:
the fixture plate includes a handle; and
the bottom surface of the accessory body is configured for receiving the handle attached to the fixture plate when the accessory container is connected to the base container.

* * * * *